(12) United States Patent
Nonaka

(10) Patent No.: US 11,796,657 B2
(45) Date of Patent: Oct. 24, 2023

(54) CONTROL DEVICE, CONTROL METHOD, PROGRAM, AND STORAGE MEDIUM

(71) Applicant: PIONEER CORPORATION, Tokyo (JP)

(72) Inventor: Yoshiya Nonaka, Kawagoe (JP)

(73) Assignee: PIONEER CORPORATION, Tokyo (JP)

(*) Notice: Subject to any disclaimer, the term of this patent is extended or adjusted under 35 U.S.C. 154(b) by 458 days.

(21) Appl. No.: 16/759,298

(22) PCT Filed: Oct. 12, 2018

(86) PCT No.: PCT/JP2018/038162
§ 371 (c)(1),
(2) Date: Apr. 24, 2020

(87) PCT Pub. No.: WO2019/082700
PCT Pub. Date: May 2, 2019

(65) Prior Publication Data
US 2021/0190958 A1 Jun. 24, 2021

(30) Foreign Application Priority Data
Oct. 26, 2017 (JP) .................................. 2017-207267

(51) Int. Cl.
*G01S 17/931* (2020.01)
*G08G 1/16* (2006.01)
(Continued)

(52) U.S. Cl.
CPC .......... *G01S 7/4972* (2013.01); *G01S 7/4817* (2013.01); *G01S 17/89* (2013.01); *G01S 17/931* (2020.01);
(Continued)

(58) Field of Classification Search
None
See application file for complete search history.

(56) References Cited

U.S. PATENT DOCUMENTS

2009/0312906 A1 12/2009 Bauer et al.
2010/0246897 A1 9/2010 Lehning
(Continued)

FOREIGN PATENT DOCUMENTS

JP 2004317134 A 11/2004
JP 2007121981 A 5/2007
(Continued)

OTHER PUBLICATIONS

International Search Report for Int. App. No. PCT/JP2018/038162 dated May 2, 2020; 3 pages.
(Continued)

*Primary Examiner* — Aniss Chad
*Assistant Examiner* — Madison R Hughes
(74) *Attorney, Agent, or Firm* — Procopio, Cory, Hargreaves & Savitch LLP

(57) ABSTRACT

A control device 6 acquires an output signal front a lidar unit 7 that can detect a feature existing around a vehicle, and calculates a reference angle θtag, indicating a tilt angle of a feature to be recognized based on an output signal from the lidar unit 7, with respect to a detection area of the lidar unit 7. The control device 6 then controls the detection area of the lidar unit 7 according to the reference angle θtag and the tilt information stored in the storage unit 2 and indicating an angle of the feature with respect to a road surface.

7 Claims, 14 Drawing Sheets

(51) Int. Cl.
  *G01S 7/497* (2006.01)
  *G01S 7/481* (2006.01)
  *G01S 17/89* (2020.01)
  *G06V 20/56* (2022.01)
  *G06F 18/213* (2023.01)
  *G01S 17/87* (2020.01)
  *G01S 7/40* (2006.01)
  *G01S 17/93* (2020.01)

(52) U.S. Cl.
  CPC .......... *G06F 18/213* (2023.01); *G06V 20/588* (2022.01); *G08G 1/165* (2013.01)

(56) References Cited

U.S. PATENT DOCUMENTS

| | | | |
|---|---|---|---|
| 2015/0362587 A1 | 12/2015 | Rogan et al. | |
| 2018/0052232 A1 | 2/2018 | Ohtomo et al. | |
| 2018/0276844 A1* | 9/2018 | Takahashi | G06T 7/85 |
| 2019/0056484 A1* | 2/2019 | Bradley | G01S 7/4815 |

FOREIGN PATENT DOCUMENTS

| | | | |
|---|---|---|---|
| JP | 2008033750 A | | 2/2008 |
| JP | 2009136987 A | | 6/2009 |
| JP | 2011027574 A | | 2/2011 |
| JP | 2011221957 A | | 11/2011 |
| JP | 2012215523 A | | 11/2012 |
| JP | 2013002820 A | | 1/2013 |
| JP | 2017211200 A | * | 11/2017 |
| JP | 2018028464 A | | 2/2018 |
| JP | 2018077178 A | | 5/2018 |

OTHER PUBLICATIONS

European Search Report issued on the corresponding European Patent Appln. No. 18871700.3 dated Jun. 22, 2021.

* cited by examiner

CONTROL DEVICE, CONTROL METHOD, PROGRAM, AND STORAGE MEDIUM

CROSS-REFERENCE TO RELATED APPLICATIONS

This application is a U.S. National Stage entry of PCT Application No. PCT/JP2018/038162, filed on Oct. 12, 2018, which claims priority to JP Application No. 2017-207267, filed Oct. 26, 2017. The contents of the foregoing are incorporated by reference.

TECHNICAL FIELD

The present invention relates to a technique for adjusting an irradiation unit for object detection.

BACKGROUND TECHNIQUE

A conventional technique is known in which, when an error occurs in a measurement unit due to a misalignment or the like, a measurement result is used in consideration of the error. For example, Patent Reference 1 discloses a vehicle including a sensor that measures the position of an object subjected to measurement during traveling of the vehicle, using a region where the object exists as a region to be measured; and a control device that corrects an error caused by an angular displacement of the mounted sensor and that controls vehicle body's movement.

PRIOR ART REFERENCES

Patent References

Patent Reference 1
Japanese Patent Laid-Open No. 2011-221957

SUMMARY OF THE INVENTION

Problems to be Solved by the Invention

In autonomous driving, it is necessary to recognize a surrounding environment of the vehicle with an external sensor such as a lidar. In case of a misalignment of the external sensor due to an accident or the like, the result of recognition of the surrounding environment given by the external sensor includes an error which causes issues of the reduced reliability of the external sensor.

The main object of the present invention, which has been made to solve the above-described problem, is to provide a control device that can appropriately measure a surrounding environment even when a detection area of an external sensor fluctuates due to an accident or the like.

Means for Solving the Problem

The invention according to an aspect is a control device including: a first acquisition unit configured to acquire an output signal from a detection device capable of detecting a feature existing around a moving object; a second acquisition unit configured to acquire first information on a tilt of a feature with respect to a detection area by the detection device, the feature being recognized based on an output signal from the detection device; and a control unit configured to control the detection area by the detection device based on the first information and second information on an angle of the feature with respect to a road surface, the second information being stored in a storage unit.

The invention according to an aspect is a control method to be executed by a control device, the control method including: a first acquisition step of acquiring an output signal from a detection device capable of detecting a feature existing around a moving object; a second acquisition step of acquiring first information on a tilt of a feature with respect to a detection area by the detection device, the feature being recognized based on an output signal from the detection device; and a control step of controlling the detection area by the detection device based on the first information and second information on an angle of the feature with respect to a road surface, the second information being stored in a storage unit.

The invention according to an aspect is a program to be executed by a computer, the program causing the computer to function as: a first acquisition unit configured to acquire an output signal from a detection device capable of detecting a feature existing around a moving object; a second acquisition unit configured to acquire first information on a tilt of a feature with respect to a detection area by the detection device, the feature being recognized based on an output signal from the detection device; and a control unit configured to control the detection area by the detection device based on the first information and second information on an angle of the feature with respect to a road surface, the second information being stored in a storage unit.

DESCRIPTION OF EMBODIMENTS

Figure 1:
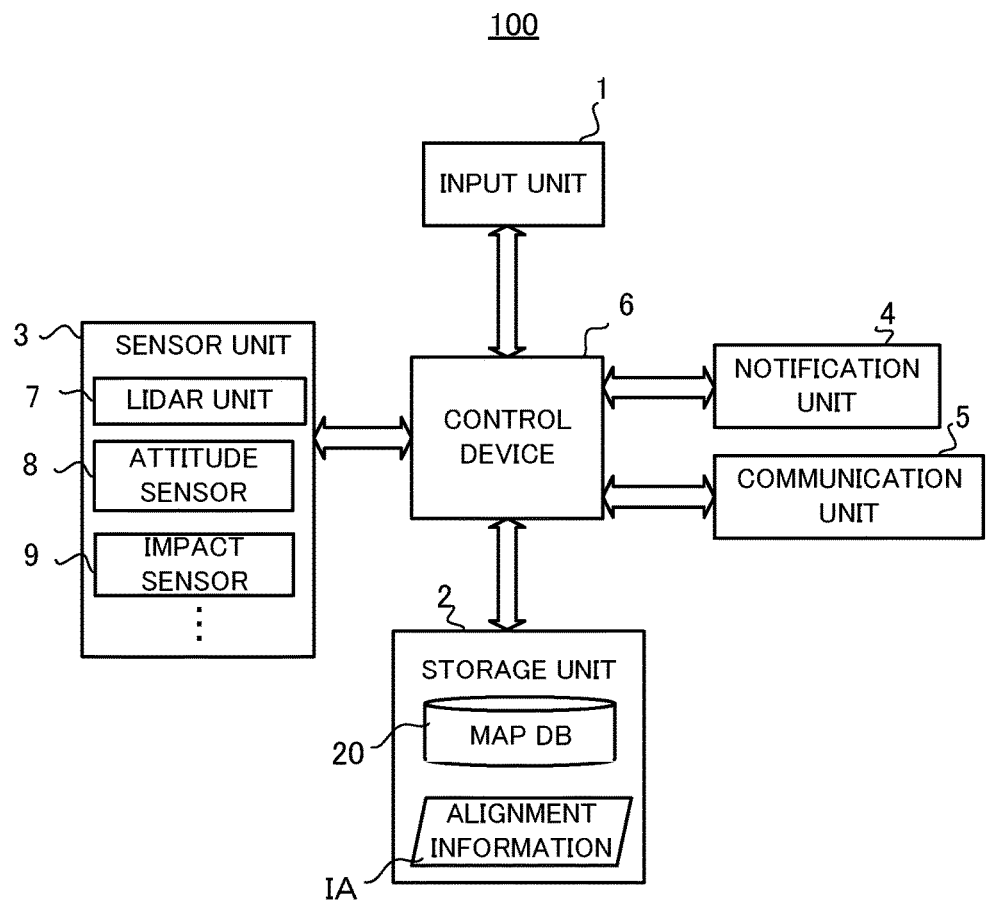
FIG. 1 shows a schematic configuration of a measurement system.

According to a preferred embodiment of the present invention, a control device includes: a first acquisition unit configured to acquire an output signal from a detection device capable of detecting a feature existing around a moving object; a second acquisition unit configured to acquire first information on a tilt of a feature with respect to a detection area by the detection device, the feature being recognized based on an output signal from the detection device; and a control unit configured to control the detection area by the detection device based on the first information and second information on an angle of the feature with respect to a road surface, the second information being stored in a storage unit. According to this aspect, the control device can appropriately specify the deviation of the detection area by the detection device based on the first information on the measured tilt of the feature and the second information on the tilt of the feature stored in the storage unit, and can accurately adjust the detection area.

In one aspect of the control device, the first information is information on an angle between a line indicating the detection area by the detection device and a predetermined portion constituting a contour of the feature recognized based on the output signal, and the second information is information on a tilt angle of the predetermined portion constituting the contour of the feature with respect to the road surface. According to this aspect, the control device can specify the deviation of the detection area by the detection device based on the tilt of the predetermined portion indicating a contour of the feature, and can appropriately adjust the detection area.

In another aspect of the control device, the first information is information on an angle between a line indicating the detection area by the detection device and a line indicating a symmetry axis of a contour of the feature recognized based on the output signal, and the second information is information on a tilt angle of the line with respect to the road surface. According to this aspect, the control device can specify the deviation of the detection area by the detection device based on the tilt of a line passing through the center of gravity of the feature, and can appropriately adjust the detection area.

In another aspect of the control device, the control unit controls the detection area by the detection device based on first information on a tilt of, among features recognized based on the output signal from the detection device, the feature perpendicular to a road surface with respect to the detection area, and second information on an angle of the feature with respect to the road surface. In this aspect, the control device specifies the deviation of the detection area by the detection device for a feature whose tilt can be measured relatively easily, and thus can more accurately adjust the detection area.

In another aspect of the control device, the control unit controls the detection area by the detection device based on first information on a tilt of, among features recognized based on the output signal from the detection device, the feature that does not change with environment with respect to the detection area, and second information on an angle of the feature with respect to the road surface. In this aspect, the control device specifies the deviation of the detection area by the detection device for a feature hardly susceptible to measurement errors in tilt measurement, and thus can more accurately adjust the detection area.

According to another preferred embodiment of the present invention, a control method to be executed by a control device includes: a first acquisition step of acquiring an output signal from a detection device capable of detecting a feature existing around a moving object; a second acquisition step of acquiring first information on a tilt of a feature with respect to a detection area by the detection device, the feature being recognized based on an output signal from the detection device; and a control step of controlling the detection area by the detection device based on the first information and second information on an angle of the feature with respect to a road surface, the second information being stored in a storage unit. By executing this control method, the control device can appropriately specify the deviation of the detection area by the detection device, and can accurately adjust the detection area.

According to still another preferred embodiment of the present invention, a program to be executed by a computer causes the computer to function as: a first acquisition unit configured to acquire an output signal from a detection device capable of detecting a feature existing around a moving object; a second acquisition unit configured to acquire first information on a tilt of a feature with respect to a detection area by the detection device, the feature being recognized based on an output signal from the detection device; and a control unit configured to control the detection area by the detection device based on the first information and second information on an angle of the feature with respect to a road surface, the second information being stored in a storage unit. By executing this program, the computer can appropriately specify the deviation of the detection area by the detection device, and can accurately adjust the detection area. The program is preferably stored in a storage medium.

EMBODIMENTS

First to third preferred embodiments of the invention will now be described with reference to the accompanying drawings.

First Embodiment

[Overall Configuration]

FIG. 1 shows a schematic configuration of a measurement system 100 according to a first embodiment. The measurement system 100 is a system that performs measurement for automatic driving of a vehicle (not shown in the drawings), and mainly includes an input unit 1, a storage unit 2, a sensor unit 3, a notification unit 4, a communication unit 5, and a control device 6. The control device 6 and other elements are configured to be capable of data communication based on a predetermined communication protocol.

The input unit 1 is a button, a touch panel, a remote controller, a voice input device, or the like to be operated by a user, and receives various inputs such as switching between autonomous driving and manual driving and whether or not to execute calibration which will be described later.

The storage unit 2 stores a program to be executed by the control device 6 and information necessary for the control device 6 to execute a predetermined process. In this embodiment, the storage unit 2 stores a map DB 20. The map DB 20 may be used for navigation during manual driving of the vehicle, or may be used for driving control for the vehicle in autonomous driving of the vehicle. The map DB 20 includes, in addition to road data and facility information, feature information related to features to be detected by a lidar unit 7 described below. Further, the storage unit 2 stores alignment information "IA" recording the positioning angle of the lidar unit 7 with respect to the vehicle after alignment, which will be described later. It is noted that "alignment"

refers to adjustment performed on the lidar unit 7 when the lidar unit 7 is manufactured or the lidar unit 7 is attached to a vehicle.

The sensor unit 3 includes an internal sensor for detecting a state of the vehicle and an external sensor for recognizing a surrounding environment of the vehicle. The sensor unit 3 includes a light detection and ranging or laser illuminated detection and ranging (lidar) unit 7, an attitude sensor 8, and an impact sensor 9.

The lidar unit 7 has a plurality of scanner units (scanners) installed in different directions, as described later. An example configuration of the lidar unit 7 will be described later with reference to FIGS. 3 to 5. The lidar unit 7 functions as a detection device having a predetermined detection area. The attitude sensor 8 is a sensor such as a three-axis acceleration sensor or a strain gauge, and is provided as a sensor for detecting an attitude of the lidar unit 7. The attitude sensor 3 may be provided in the lidar unit 7 or, as a sensor for detecting the attitude of the vehicle, may also be provided in the vehicle. The impact sensor 9 is a sensor that detects an impact on the vehicle and may be an acceleration sensor or a sensor that generates an airbag opening signal based on impact. It is noted that the impact sensor 9 may be provided in the lidar unit 7.

The notification unit 4 is, for example, a display or a speaker that outputs under control by the control device 6. The communication unit 5 performs data communication with an external device under control by the control device 6.

The control device 6 includes a CPU that executes a program, and controls the entire measurement system 100. In this embodiment, when the control device 6 judges that a misalignment or the like of the lidar unit 7 has occurred based on an output of the sensor unit 3 such as the attitude sensor 8, the control device 6 performs calibration of the lidar unit 7 or a switchover to the manual driving. Here, "calibration" refers to adjustment performed on the lidar unit 7 after the lidar unit 7 is mounted on the vehicle. The control device 6 may be an electronic control unit (ECU) that automatically controls driving of the vehicle, or nay be a CPU or the like of an in-vehicle device that transmits a control signal for instructing the ECU to perform switching between autonomous driving and manual driving. In another example, the control device 6 may be configured to be a part of the lidar unit 7. Further, the control device 6 may perform a highly accurate vehicle position estimation based on the output of the sensor unit 3 and the map DB 20.

[Functional Block]

Figure 2:
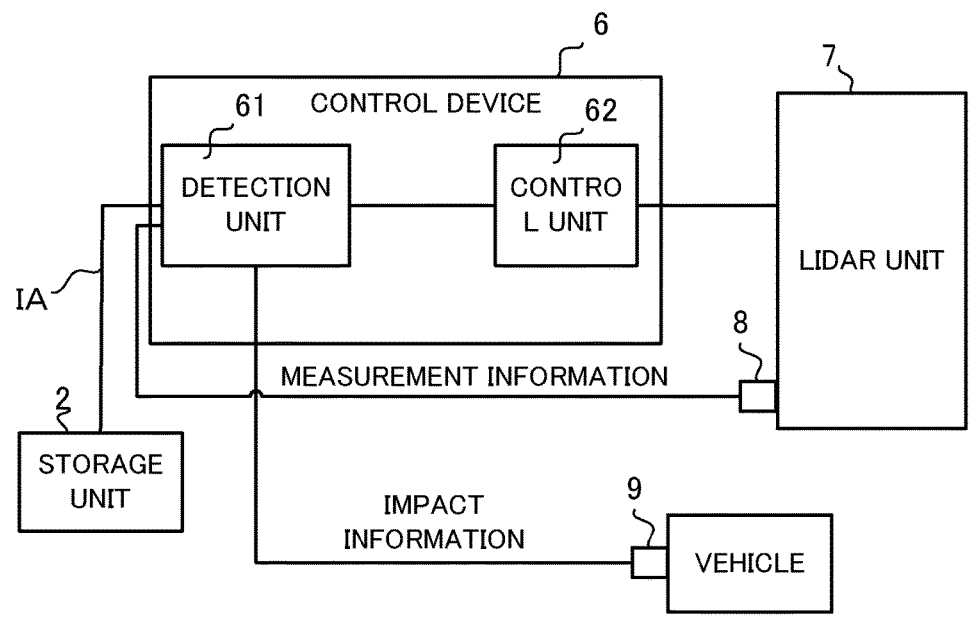
FIG. 2 is a block diagram schematically showing a process in a control device.

FIG. 2 is a block diagram schematically showing a process in the control device 6 of the first embodiment. As shown in FIG. 2, the control device 6 functionally includes a detection unit 61 and a control unit 62.

The detection unit 61 acquires a detection signal, as measurement information indicating a current positioning angle of each scanner of the lidar unit 7, from the attitude sensor 8 provided in the lidar unit 7. The detection unit 61 detects a misalignment of the lidar unit 7 by referring to the alignment information IA, which indicates the positioning angle of each scanner at the time when the alignment has been performed and which is stored in the storage unit 2, and thereafter by comparing it with the above-described measurement information. In addition, the detection unit 61 acquires, from the impact sensor 9, a detection signal, as impact information on the vehicle, generated by the impact sensor 9 when a vibration of a predetermined degree or more occurs in the vehicle. The detection unit 61 transmits information on a detected direction and amount of displacement (angle) of the lidar unit 7 to the control unit 62 when detecting the misalignment of the lidar unit 7 based on the measurement information given by the attitude sensor 8 or when receiving the impact information from the impact sensor 9.

As described above, in this embodiment, when a misalignment of the lidar unit 7 adjusted by alignment occurs due to an accident, the control device 6 performs the calibration of the lidar unit 7 to suppress a displacement of the measurement area by the lidar unit 7, thereby appropriately maintaining a state where autonomous driving can be continued.

[Example Configuration of Lidar Unit]

Figure 3:
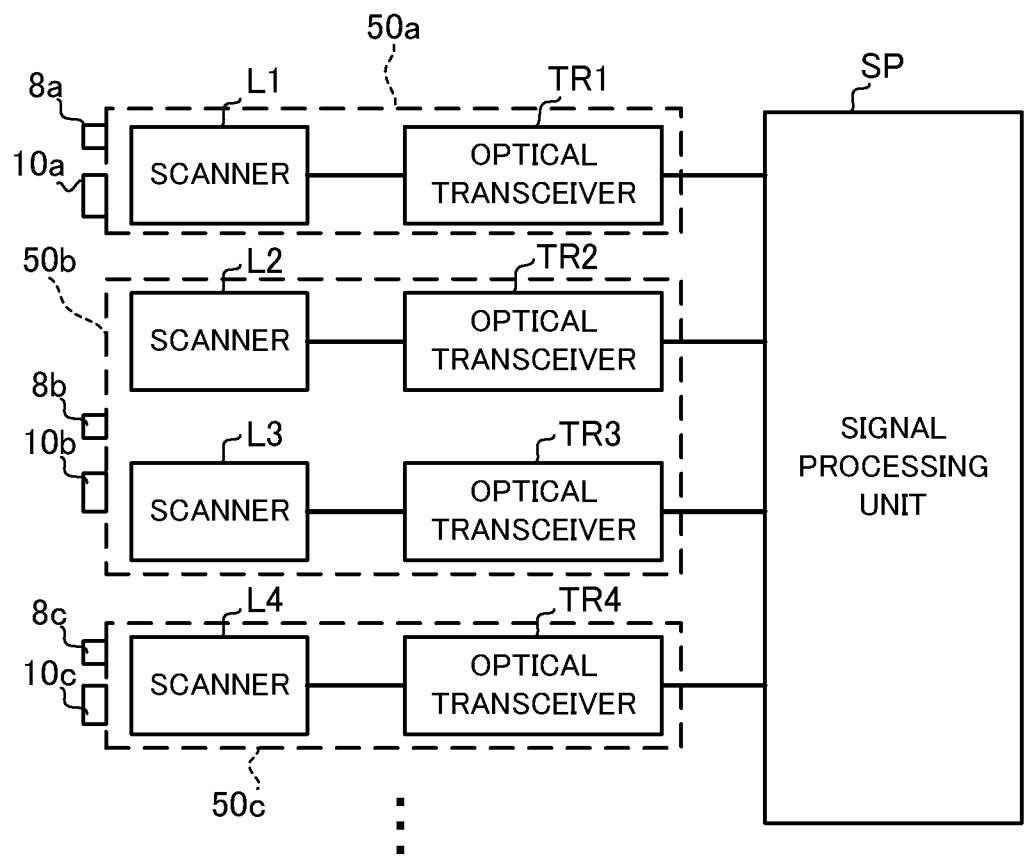
FIG. 3 shows a block configuration of a lidar unit.

An example configuration of the lidar unit 7 will now be described. FIG. 3 is a block diagram of the lidar unit 7. The lidar unit 7 is a time of flight (TOF) lidar, and measures the distance of an object around the vehicle and detects the object. The lidar unit 7 is used, for example, as a part of an advanced driving support system for the purpose of assisting in recognition of the surrounding environment of the vehicle. The lidar unit 7 mainly includes a plurality of scanners (L1 to L4, . . . ), a plurality of optical transceivers (TR1 to TR4, . . . ), and a signal processing unit SP. In the following description, when the scanners (L1 to L4, . . . ) are not distinguished from each other, they are simply referred to as a "scanner L", and when the optical transceivers (TR1 to TR4, . . . ) are not distinguished from each other, they are simply referred to as an "optical transceiver TR".

The scanners L emit a laser pulse (hereinafter, also referred to as a "transmission light pulse") within a predetermined horizontal angle and vertical angle ranges. The scanner L emits a transmission light pulse for each segment obtained by dividing the aforementioned horizontal angle range by an equal angle. The optical transceiver TR outputs a signal related to a light receiving intensity of each segment (also referred to as a "segment signal Sseg") generated by receiving reflected light of the transmission light pulse (hereinafter, also referred to as a "reception light pulse") within a predetermined period after the emission of the transmission light pulse, to a signal processing unit SP. The signal processing unit SP outputs point cloud information indicating a set of a distance to a point of each object irradiated with a transmission light pulse and an angle of the object, based on the segment signal Sseg for each segment received from the optical transceiver TR.

In this embodiment, the scanner L and the optical transceiver TR are contained in a scanner container 50 (50*a* to 50*c*, . . . ). Each scanner container 50 contains one or more sets of scanner L and an optical transceiver TR. In an example shown in FIG. 3, the scanner container 50*a* contains the scanner L1 and the optical transceiver TR1, the scanner container 50*b* contains the scanners L2 and L3 and the optical transceivers TR2 and TR3, and the scanner container 50*c* contains the scanner L4 and the optical transceiver TR4. Each scanner container 50 has the attitude sensor 8 (8*a* to 8*c*, . . . ) for detecting an attitude of the scanner container 50, and an adjustment mechanism 10 (10*a* to 10*c*, . . . ) for adjusting an orientation of the scanner container 50.

The attitude sensor 8 (8*a* to 8*c*, . . . ) is a sensor used for detecting misalignment of each scanner container 50, and transmits a detection signal to the control device 6. The adjustment mechanism 10 includes, for example, an actuator, and adjusts the orientation of the scanner container 50 based on a control signal received from the control device 6. It is noted that the attitude sensor 8 and the adjustment mechanism 10 shown in FIG. 3 may be provided for each scanner L instead of being provided for each scanner container 50.

Figure 4:
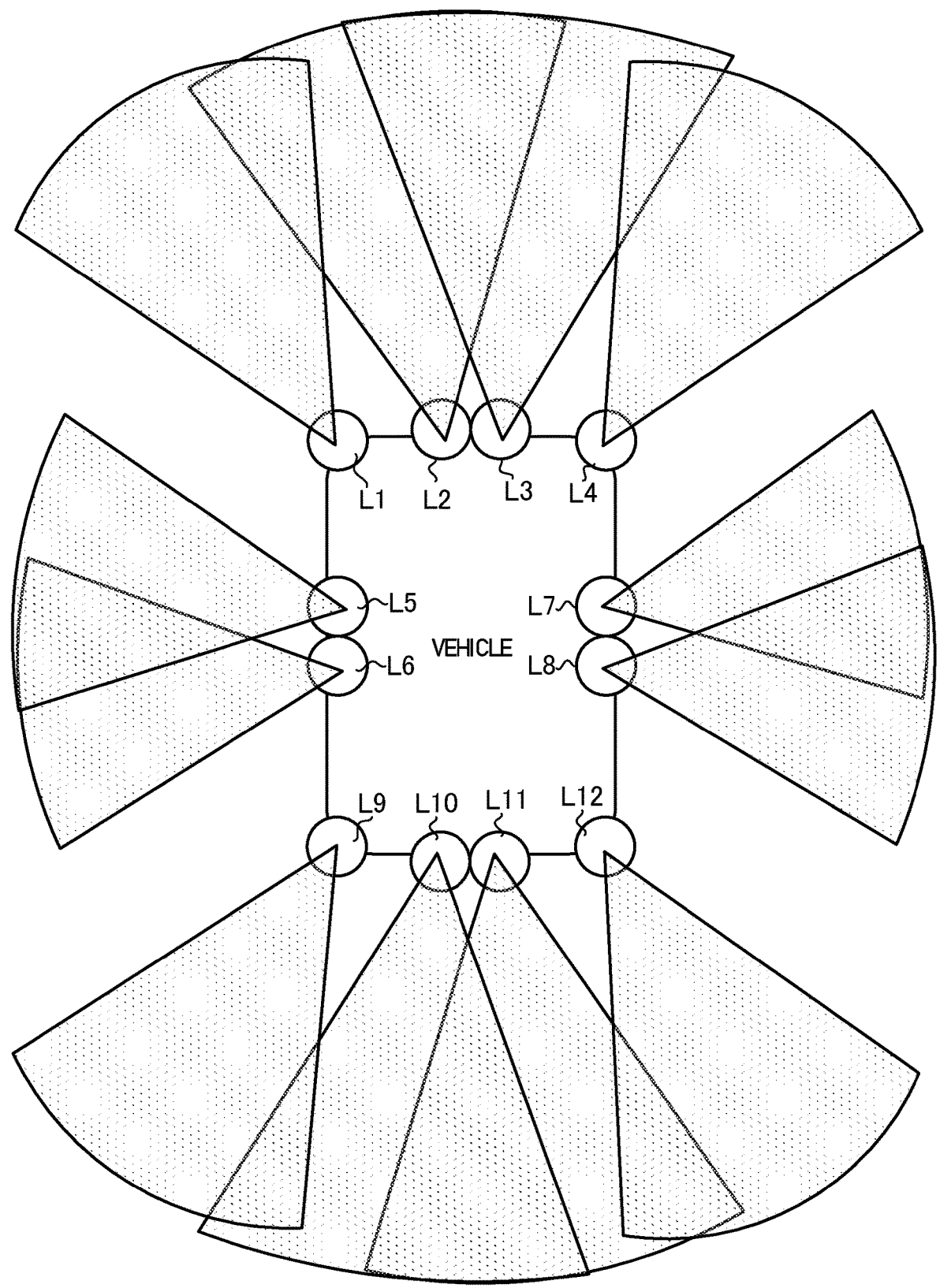
FIG. 4 shows an example scanner positioning.

FIG. 4 shows an example of positioning of the individual scanners L of the lidar unit 7. In FIG. 4, hatched fan-shaped areas indicate areas to be scanned using the transmission light pulse emitted from the corresponding scanners L. In an example show in FIG. 4, the vehicle is provided with twelve scanners L (L1 to L12), the scanners L1 to L4 are oriented so that the scan area is situated at the front of the vehicle, and the scanners L5 and L6 are oriented so that the scan area is situated at the left of the vehicle. The scanners L7 and L8 are oriented so that the scan area is situated at the right of the vehicle, and the scanners L9 to L12 are oriented so that the scan area is situated at the rear of the vehicle.

Figure 5:
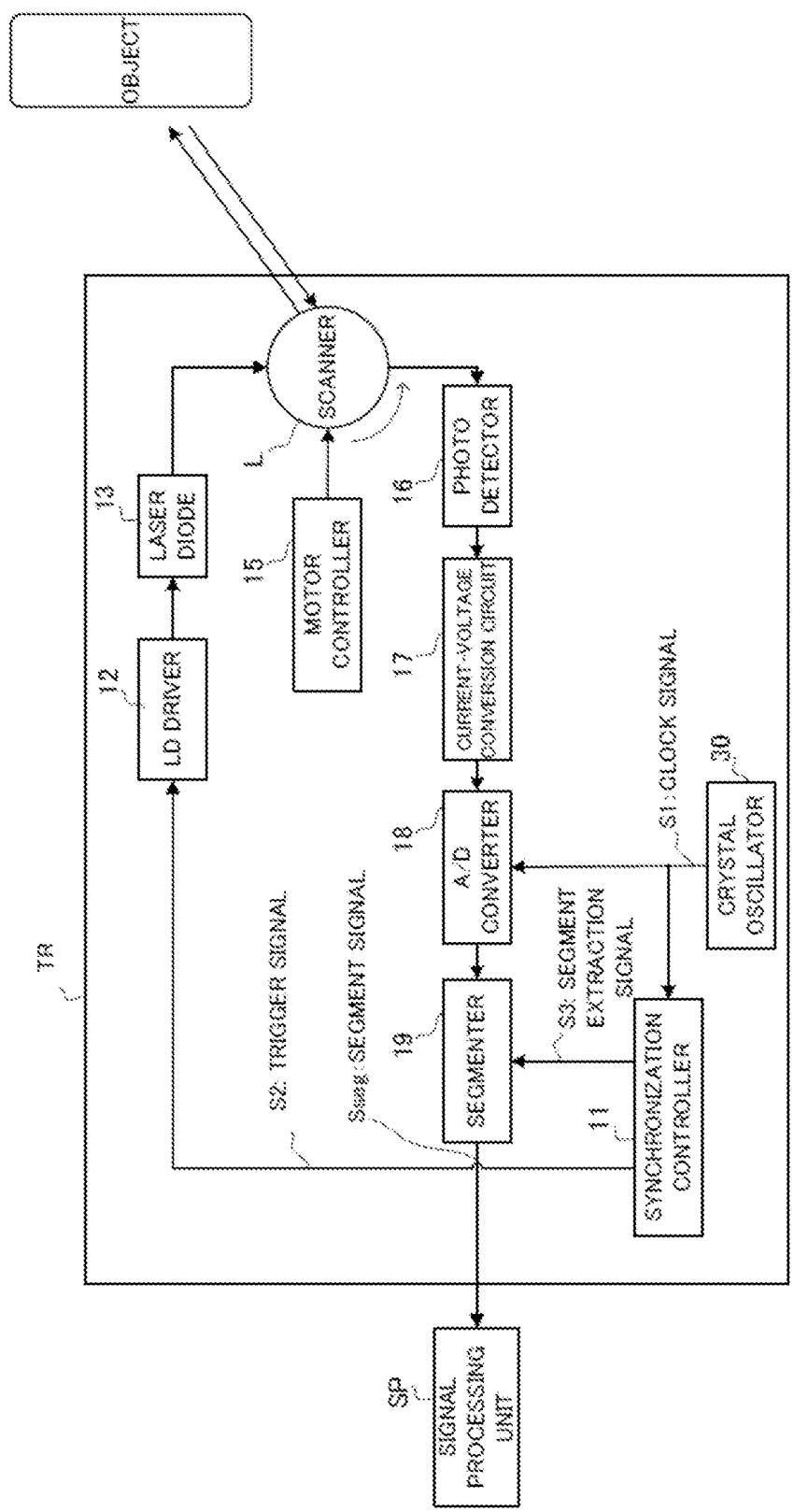
FIG. 5 shows an example schematic configuration of an optical transceiver.

FIG. 5 shows an example of schematic configuration of the optical transceiver TR. As shown in FIG. 5, the optical transceiver TR mainly includes a synchronization controller 11, an LD driver 12, a laser diode 13, a motor controller 15, a photodetector 16, a current-voltage conversion circuit (transimpedance amplifier) 17, an A/D converter 18, a segmenter 19, and a crystal oscillator 30.

The crystal oscillator 30 outputs a pulsed clock signal "S1" to the synchronization controller 11 and the A/D converter 18. The synchronization controller 11 outputs a pulsed trigger signal "S2" to the LD driver 12. The synchronization controller 11 outputs a segment extraction signal "S3" that determines the timing of when the segmenter 19 extracts an output of the A/D converter 18, which will be described later, to the segmenter 19.

The LD driver 12 supplies a pulse current to the laser diode 13 in synchronization with a trigger signal S2 input from the synchronization controller 11. The laser diode 13 is, for example, an infrared pulse laser, and emits an optical pulse based on a pulse current supplied from the LD driver 12.

The scanner L is configured to be, for example, a scanner including a transmission and reception optical system, scans the transmission light pulse emitted from the laser diode 13, and guides a reception light pulse, which is light reflected on and returning from an object irradiated with the emitted transmission light pulse, to the photodetector 16. In this embodiment, the scanner L includes a motor for rotation. Thus, the scanner L functions as an irradiation unit that emits electromagnetic waves.

The photodetector 16 is, for example, an avalanche photodiode, and generates a weak current dependent on an amount of reflected light from the object guided by the scanner L, that is, a reception light pulse. The photodetector 16 supplies the generated weak current to the current-voltage conversion circuit 17. The current-voltage conversion circuit 17 amplifies the weak current supplied from the photodetector 16 and converts it into a voltage signal, and inputs the converted voltage signal to the A/D converter 18.

The A/D converter 18 converts the voltage signal supplied from the current-voltage conversion circuit 17 into a digital signal based on the clock signal S1 supplied from the crystal oscillator 30, and supplies the converted digital signal to the segmenter 19. The segmenter 19 generates, as the segment signal Sseg, the digital signal that is output from the A/D converter 18 during a period in which the segment extraction signal S3 is asserted. The segmenter 19 supplies the generated segment signal Sseg to the signal processing unit SP.

The signal processing unit SP generates the point cloud information indicating the distance and the angle of the object for each optical transceiver TR, based on the segment signal Sseg transmitted from each optical transceiver TR. To be specific, the signal processing unit SP detects a peak from a waveform of the segment signal Sseg, and estimates an amplitude and a delay time corresponding to the detected peak. The signal processing unit SP generates, as information on each point constituting the point cloud information, a set of information on the distance and information on an angle corresponding to a target segment, wherein the distance corresponds to a delay time of, among peaks of the waveform indicated by the segment signal Sseg, a peak at which the estimated amplitude is greater than or equal to a predetermined threshold.

[Alignment Process]

An alignment process, which is an adjustment process performed on the lidar unit 7 when the lidar unit 7 is manufactured or the lidar unit 7 is attached to a vehicle, will now be described.

The point cloud information generated based on the reception light pulse received by each optical transceiver TR via each scanner L is information represented by a local coordinate system with respect to the orientation and position of each scanner L, and depends on a relative position (specifically, the position and the positioning angle) of each scanner L with respect to the vehicle. For this reason, after alignment of each scanner L with respect to the vehicle, the measurement system 100 generates the alignment information IA indicating the position and the positioning angle of each scanner L with respect to the vehicle after the alignment, and stores it in the storage unit 2.

Thus, for example, when the vehicle is running, the control device 6 or the signal processing unit SP refers to the alignment information IA stored in the storage unit 2, thereby converting the coordinate system of the point cloud information obtained for each scanner L to a common coordinate system with respect to the vehicle, and uses positional information and orientation information on the vehicle, thereby achieving conversion to an absolute coordinate system with respect to the latitude, longitude, and altitude. It this embodiment, as described later, the control device 6 refers to the alignment information IA to appropriately detect the misalignment of the scanner container 50.

[Accident Detection Process]

When a vehicle accident is estimated, the control device 6 determines that the calibration of the lidar unit 7 is necessary. Here, a vehicle accident detection process will be described.

(1) Detection Based on Reference Angle

When the positioning angle (also referred to as a "reference angle") of the scanner container 50 or the scanner L with respect to the vehicle indicated by the alignment information IA stored in the storage unit 2 differs from a current positioning angle (also referred to as a "latest measurement angle") of the scanner container 50 or the scanner L measured with the attitude sensor 8, the control device 6 determines that the misalignment of the scanner container 50 or the scanner L has occurred due to an accident.

Here, to calculate the above-described latest measurement angle, the control device 6 performs a process of canceling an inclination of the vehicle. To be specific, the control device 6 corrects the angle measured by the attitude sensor 8 installed in the scanner container 50 by the tilt angle of the vehicle measured by the attitude sensor 8 or the like provided in the vehicle, thereby calculating the latest measurement angle while excluding the influence of the inclination of the vehicle. It is noted that the control device 6 may recognize the tilt angle of the vehicle based on tilt information in the road data registered in the map DB 20, and calculate the latest measurement angle. In this case, the control device 6 acquires, from the map DB 20, the tilt information on the road to which a current position belongs, based on own vehicle positional information recognized through the output of the sensor unit 3.

Figure 6A:
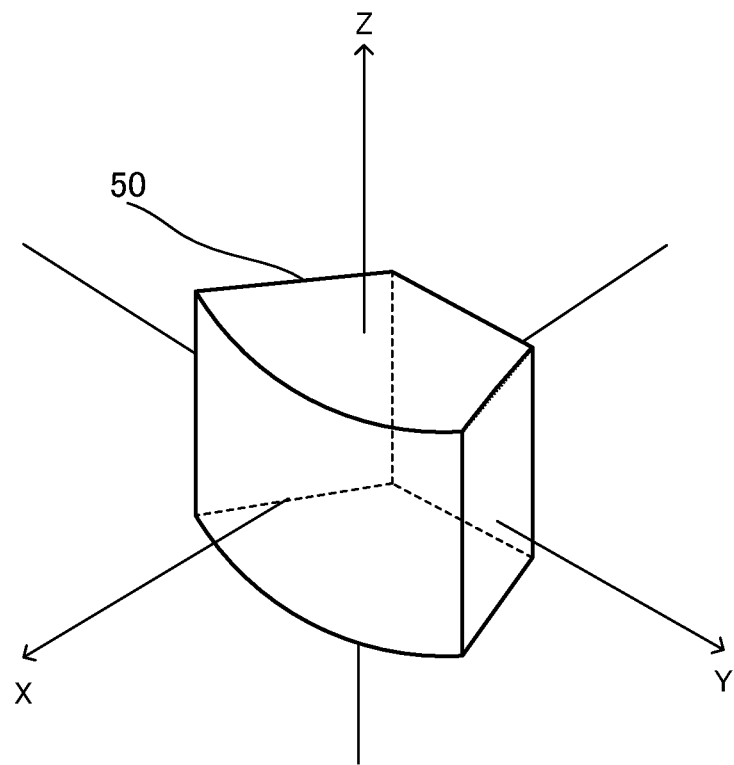
FIGS. 6A and 6B show a three-axis coordinate system detected by a three-axis sensor installed in the scanner container.

FIG. 6A shows a coordinate system with three axes (X, Y, and Z) detected by the attitude sensor 8 installed in the scanner container 50 where no misalignment is occurring. In an example of FIG. 6A, the vehicle is placed on a flat surface, and the attitude sensor 8 detects acceleration in each of the XYZ axes. Here, the "X axis" indicates the direction extending toward the front of the scanner container 50 (that is, a laser emission direction), the "Y axis" indicates the direction extending toward the left and right of the scanner container 50, and the "Z axis" indicates the direction extending in the height direction of the scanner container 50. In a state with no misalignment, the X axis and the Y axis are substantially perpendicular to gravitational acceleration, and the Z axis is substantially parallel to the gravitational acceleration.

Figure 6B:
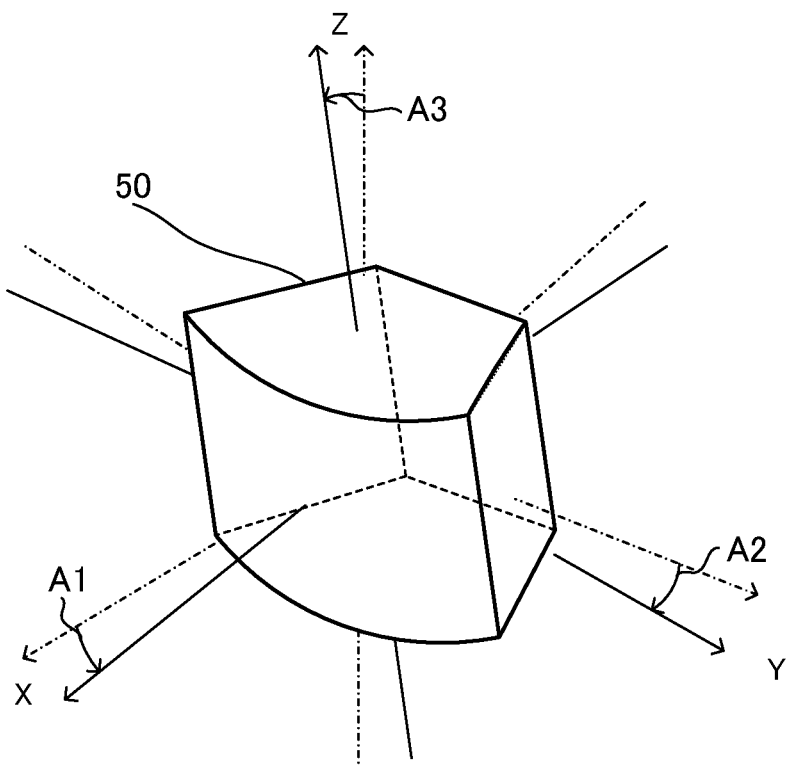

FIG. 6B is a diagram showing a change in the orientation of the scanner container 50 that occurs when the scanner container 50 shown in FIG. 6A is misaligned due to an impact caused by an accident or the like. In FIG. 6B, XYZ coordinate axes represented by the solid lines indicate three coordinate axes detected by the attitude sensor 8 installed in the inclined scanner container 50, and the XYZ coordinate axes represented by the dot-dash line indicate three coordinate axes observed before the scanner container 50 shown in FIG. 6A is inclined.

In an example shown in FIG. 6B, the scanner container 50 is inclined from a state shown in FIG. 6A, so that the measured values of the three axes of the attitude sensor 8 differ by a displacement along the X axis (see an arrow A1), a displacement along the Y axis (see an arrow A2), and a displacement along the Z axis (see an arrow A3) between before and after the inclination of the scanner container 50. In this manner, in case of a misalignment of the scanner container 50 due to an accident or the like, a deviation in the positioning angle of the scanner container 50 (rotational shift) occurs and the value measured by the attitude sensor 8 changes between before and after the misalignment depending on the deviation. In consideration of this fact, in this embodiment, for each scanner container 50, the control device 6 compares the reference angle indicated by the alignment information IA with the latest measurement angle based on the output of the attitude sensor 8 for each rotational direction (for example, a roll direction around the X axis, a pitch direction around the Y axis, and a yaw direction around the Z axis). If there is a rotation direction in which a deviation of greater than or equal to a predetermined angle has occurred, it is estimated that a misalignment of the scanner container 50 has occurred due to an accident or the like.

It is noted that, when a misalignment that does not involve a change in the positioning angle (that is, a positional deviation along the X axis, Y axis, and/or Z axis) occurs, the value measured by the attitude sensor 8 does not change between before and after the shift. In contrast, when the scanner container 50 is displaced due to an impact such as an accident, in addition to the positional deviation, the deviation of the positioning angle is necessarily expected. Therefore, in this embodiment, the control device 6 determines the necessity of the calibration by detecting the deviation of the positioning angle of the scanner container 50.

(2) Detection by Other Methods

The control device 6 may also estimate that a misalignment of the scanner container 50 due to an accident has occurred and determine that a calibration process described below should be performed even when an abnormality is detected by any of methods described below (second and third methods) instead of a misalignment detection process based on the alignment information IA described above.

In the second method, when the control device 6 judges, on the basis of an output of the impact sensor 9 provided to the vehicle, that an impact of a predetermined degree or more has occurred in the vehicle, the control device 6 determines that a misalignment of the scanner container 50 has highly probably occurred due to an accident and that a calibration process described later is necessary. For example, as described with reference to FIG. 2, upon reception of the impact information indicating that an impact, of a predetermined degree or more has occurred from the impact sensor 9, the control device 6 judges that an impact has occurred on the vehicle. This also allows the control device 6 to appropriately detect the occurrence of the misalignment of the scanner container 50.

In the third method, in an event of an error in a process of recognizing an object, the control device 6 determines that a misalignment of the scanner container 50 has highly probably occurred due to an accident and a calibration process described later is necessary. For example, when a road surface recognized by synthesizing the point cloud information generated based on the reception light pulse of each scanner L is distorted, that is, when the tilt angle differs among the road surfaces indicated by the point cloud information on each scanner L, the control device 6 determines that at least one of the scanners L is misaligned.

In another example based on the third method, the control device 6 compares, for scanners L whose scan areas overlap, the point cloud information related to the overlapping areas and, if the point clouds indicated by the compared point cloud information are deviated, determines that at least one of the scanners L having an overlapping scan area is misaligned.

In still another example based on the third method, when the accuracy of the positional information on the vehicle is sufficiently high, the control device 6 converts positional information on a specific feature registered in the map DB 20 and the point cloud information that includes the feature in its scan area into a same coordinate system based on the positional information on the vehicle, and then compares them. When the position indicated by the positional information on the feature and the position of the feature indicated by the point cloud information are deviated, the control device 6 determines that the scanner L that has scanned the feature is misaligned.

In still another example based on the third method, the control device 6 checks a position of an object recognized based on an image output from a camera included in the sensor unit 3 against a position of the same object recognized based on the point cloud information output from the lidar unit 7. In an event of a predetermined amount or more of deviation of the position of the checked object, the control device 6 determines that a misalignment of the scanner container 50 has highly probably occurred due to an accident and a calibration process is necessary. In this case, the control device 6 may measure a three-dimensional position of the object based on outputs of a plurality of cameras, and compare the measured three-dimensional position with a three-dimensional position based on the point cloud information output by the lidar unit 7.

[Calibration Process]

A description will now be given of a calibration process performed when the lidar unit 7 is misaligned due to a vehicle accident.

The control device 6 performs at least electronic adjustment for changing an actual scan area, which will be described later, or physical adjustment by control by the adjustment mechanism 10 provided in each scanner container 50, as the calibration process. It is noted that the control device 6 calculates, for each direction in a process preparatory to the calibration process, the difference between the reference angle of each scanner container 50 indicated by the alignment information IA stored in the storage unit 2 and the latest measurement angle indicated by the measurement information output by the attitude sensor 8 of each scanner container 50, thereby specifying a misalignment (that is, the direction of and the amount of misalignment) of each scanner container 50.

Figure 7A:
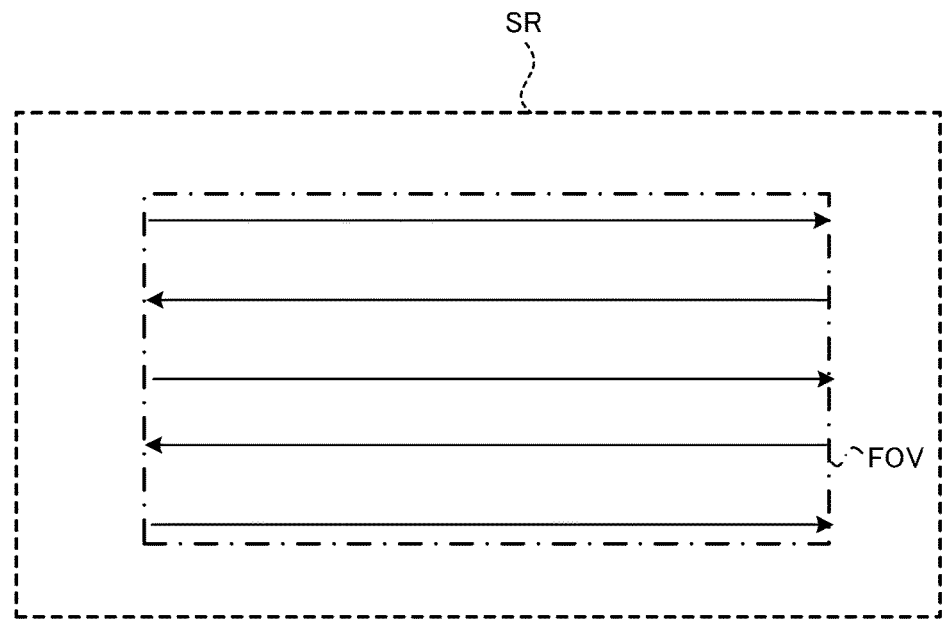
FIGS. 7A and 7B show a positional relationship between a scannable area and an actual scan area.

A specific example of the above-described electronic adjustment will now be described. FIG. 7A shows relationship, before the execution of the calibration process, between a scannable area "SR" of a scanner L and an actual scan area "FOV" on a virtual irradiation plane perpendicular to the direction of emission by the scanner L. Here, the scannable area SR indicates an area scannable with the transmission light pulse, and the actual scan area FOV indicates an area actually being scanned with the transmission light pulse. It is noted that arrows in the actual scan area FOV indicate example scanning directions.

As shown in FIG. 7A, the control device 6 moves the actual scan area FOV within the scannable area SR based on the direction of and the amount of deviation of the scannable area.

Figure 7B:
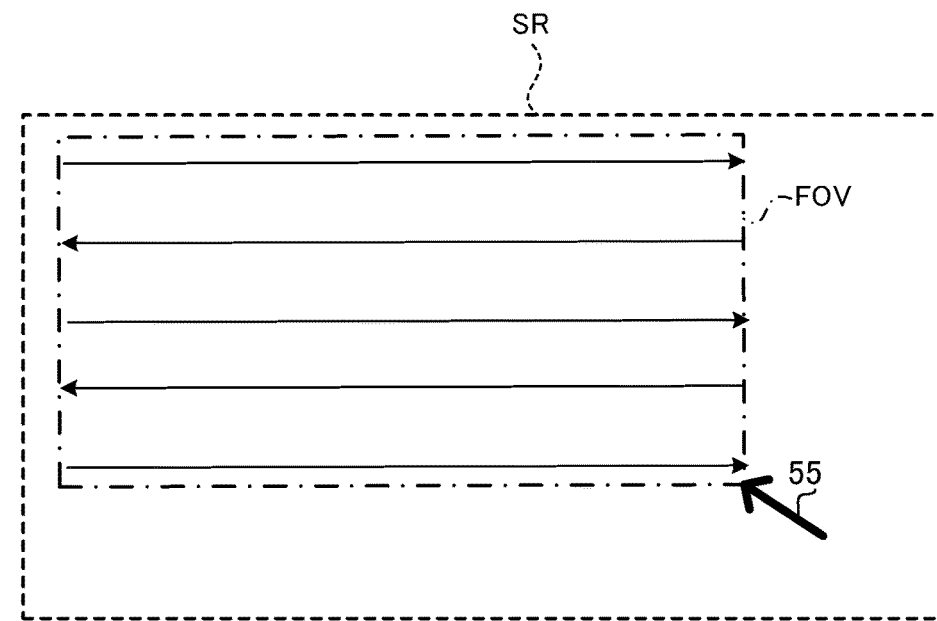

FIG. 7B shows the relationship, after the alignment adjustment that is the electronic adjustment by the control device 6, between the scannable area SR obtained and the actual scan area FOV, wherein the area is made smaller than the scan area SR of the scanner L. In the example shown in FIG. 7R, the control device 6 transmits a control signal instructing to change parameters of an internal signal of the optical transceiver TR, based on the direction of and the amount of misalignment that has occurred in the scanner container 50 that contains that scanner L. Hence, the control device 6 moves the actual scan area FOV by a predetermined distance in an upper left direction (see an arrow 55). In this case, for example, the control device 6 previously stores a map or the like for each scanner L indicating a travel direction and a width of shifting the actual scan area FOV according to the deviation of each scanner container 50 in the storage unit 2, and generates the aforementioned control signal based on the travel direction and the width of shifting the actual scan area FOV determined by referring to the map. Hence, the control device 6 appropriately adjusts the current scan area of the lidar unit 7 to equal to the scan area of the lidar unit 7 immediately after the alignment process (that is, before the occurrence of the misalignment).

As described above, the control device 6 moves the actual scan area FOV based on the electronic adjustment, thereby appropriately suppressing a decrease in the accuracy of the process of recognizing an object using the lidar unit 7 even if a misalignment occurs due to an accident or the like, so that the autonomous driving control can be continued.

The control device 6 may perform the physical adjustment for moving the actual scan area FOV by controlling the adjustment mechanism 10 of the scanner container 50 instead of the aforementioned electronic adjustment. In this case, for example, each scanner container 50 is rotatable in the roll direction, the pitch direction, and the yaw direction, and the adjustment mechanism 10 adjusts the angle in an arbitrary rotational direction of the corresponding scanner container 50, based on the control signal supplied from the control device 6.

Accordingly, when performing the above-described physical adjustment, the control device 6 generates the control signal to be transmitted to the adjustment mechanism 10 based on the direction of and the amount of misalignment of the specified scanner container 50 so that the actual scan area FOV becomes substantially the same before and after the misalignment. In this case, for example, a map indicating the relationship between the direction of and the amount of misalignment of the scanner container 50 and the travel direction (for example, the directions around the X, Y, and Z axes in FIG. 6) and the travel amount of the scanner container 50 is previously stored in the storage unit 2. The control device 6 then generates the control signal for the adjustment mechanism 10 of the misaligned scanner container 50 by referring to the aforementioned map.

When judging that only the aforementioned electronic adjustment cannot adjust, the actual scan area FOV to the scan area equivalent to the scan area of the lidar unit 7 immediately after the alignment process (that is, before the misalignment, occurs), the control device 6 preferably adjusts the position of the scanner container 50 based on the control by the adjustment mechanism 10.

If the misalignment of the scanner container 50 is so large that the actual scan area FOV cannot be adjusted to the same area before and after the misalignment by the aforementioned electronic adjustment and physical adjustment, the control device 6 does not perform the calibration process. In this case, instead of the calibration process, the control device 6 causes the notification unit 4 to output an output prompting or notifying a switchover to the manual driving, or causes the notification unit 4 to output the warning that an error has occurred. In this case, for example, when detecting a user input instructing to switch to the manual driving or after a lapse of a predetermined time from the above-mentioned warning, the control device 6 switches the driving mode of the vehicle from autonomous driving to manual driving. Accordingly, the control device 6 can prevent the autonomous driving from continuing with low accuracy of a recognition process using the lidar unit 7, thereby appropriately securing safety.

[Process Flow]

The alignment process executed before shipment of the vehicle and a process executed in autonomous driving after the shipment of the vehicle will now be described with reference to flowcharts of FIGS. 8 and 9.

(1) Alignment Process

Figure 8:
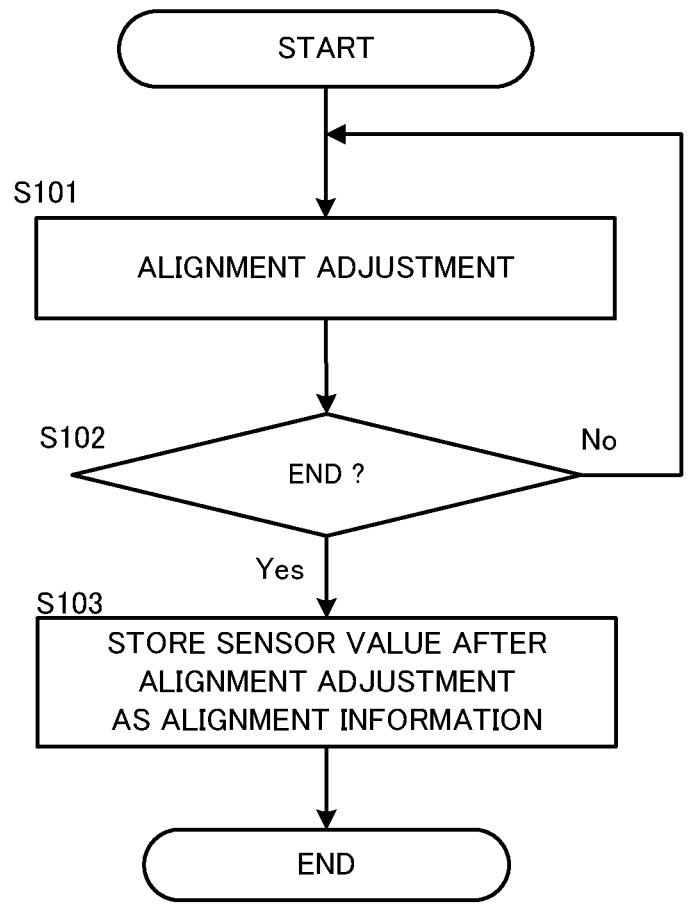
FIG. 8 is a flowchart showing a procedure of an alignment process.

FIG. 8 is a flowchart showing a procedure of an alignment process of the lidar unit 7. The measurement system 100 executes the process of the flowchart shown in FIG. 6 when each scanner L is installed in a vehicle. It is noted that the alignment process is performed while the vehicle is placed on a horizontal place.

First, the scanner containers 50 containing the scanners L are fitted in respective predetermined positions of the vehicle, and the alignment of each scanner container 50 is adjusted (Step S101). In this case, for example, the control device 6 transmits the control signal to the adjustment mechanism 10 of the scanner container 50 that requires the position adjustment, based on an input to the input unit 1 or the like, thereby adjusting at least one of the angles in the pitch direction, yaw direction, and roll direction of the scanner container 50. In another example, the alignment of each scanner container 50 may be adjusted by a manual operation.

The measurement information output by the attitude sensor 8 provided in each scanner container 50 after the completion of the alignment adjustment in Step S101, which is confirmed in Step S102, is stored in the storage unit 2 as the alignment information IA indicating the reference angle of each scanner container 50 (Step S103).

(2) Process in Autonomous Driving

Figure 9:
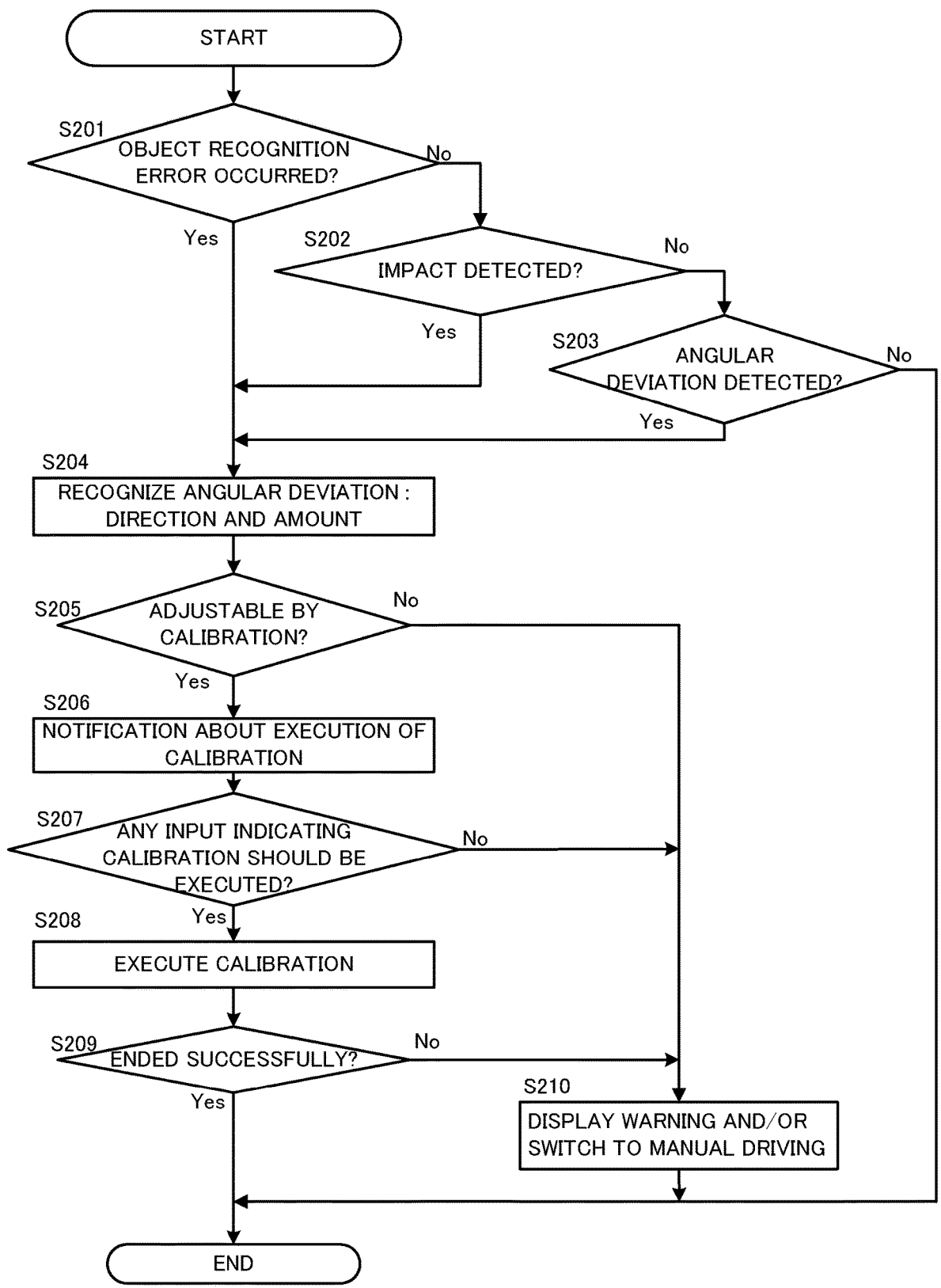
FIG. 9 is a flowchart showing a procedure during autonomous driving.

FIG. 9 is an example flowchart showing a process flow executed by the control device 6 in autonomous driving. The control device 6 repeatedly executes the process of the flowchart in FIG. 9, for example, in a predetermined cycle.

First, the control device 6 determines whether or not an error has occurred in recognition of an object (Step S201). In this case, the control device 6 determines whether or not any deviation or the like has occurred in the point cloud information obtained for each scanner L, using the third method described in the section [Accident Detection Process]. If an error has occurred in recognition of the object (Step S201; Yes), the process proceeds to Step S204.

In contrast, if no error has occurred in recognition of the object (Step S201; No), the control device 6 determines whether or not an impact estimated to be an accident has been detected (Step S202). In this case, the control device 6 determines whether or not the value indicated by the impact information output from the impact sensor 9 has temporarily exceeded a predetermined threshold, using the second method described in the section [Accident Detection Process]. If the control device 6 has detected an impact that is estimated to be an accident (Step S202; Yes), the process proceeds to Step S204.

In contrast, if no impact has been detected (Step S202; No), the control device 6 determines whether or not a predetermined amount or more of angular deviation has been detected between the reference angle indicated by the alignment information IA and the latest measurement angle detected by the attitude sensor 8 (Step S203). Upon detection of the above-described angular deviation (Step S203; Yes), the control device 6 shifts the process to Step S204. In contrast, if the above-described angular deviation has not been detected (Step S203; No), it is judged that no misalignment has occurred in the lidar unit 7, and the process of the flowchart ends.

Next, upon detection of an abnormality in any of Steps S201 to S203, the control device 6 recognizes the direction of and the amount of angular deviation between the reference angle and the latest measurement angle (Step S204). The control device 6 then determines whether or not the actual scan area FOV can be adjusted so that the above-described angular deviation is compensated for by the calibration process (Step S205). For example, the control device 6 previously stores information on the range of the angular deviation that can be adjusted by the electronic adjustment or the physical adjustment described in the section [Calibration Process] in the storage unit 2 and refers to the aforementioned information on the range, thereby determining whether or not the actual scan area FOV can be adjusted by the calibration process.

If the control device 6 judges that the actual scan area FOV can be adjusted so that the above-described angular deviation can be conpensated for by the calibration process (Step S205; Yes), the notification unit 4 outputs a notification about the execution of the calibration process (Step S206). For example, through the calibration process, the control device 6 outputs a notification that the autonomous driving can be continued, and gives an output that promotes an input to select execute or not execute the calibration process, using the notification unit 4. Upon detection of an input indicating that the calibration process should be executed (Step S207; Yes), the control device 6 executes the calibration process (Step S208). In this case, for example, when it is possible to compensate for the above-mentioned angular deviation by adjusting the actual scan area FOV by the electronic adjustment, the control device 6 adjusts the actual scan area FOV by the electronic adjustment. If the above-described angular deviation cannot be compensated for by the electronic adjustment alone, the actual scan area FOV is adjusted by performing the physical adjustment of the scanner container 50 based on the control by the adjustment mechanism 10. When the calibration process successfully ended (Step S209; Yes), the control device 6 ends the process of the flowchart. In this case, the control device 6 continuously controls autonomous driving.

In contrast, if the actual scan area FOV cannot be adjusted so that the above-described angular deviation can be compensated for by the calibration process (Step S205; No), if there is no input indicating that the calibration process should be executed (Step S207; No), or if the calibration process did not end successfully (Step S209; No), the control device 6 displays a predetermined warning or/and performs a switchover to manual driving (Step S210). In this case, the control device 6 outputs a notification that, the autonomous driving cannot be continued or a notification promoting a switchover to manual driving, or performs an automatic switchover to manual driving after the aforementioned notification is issued. Hence, when the reliability of the lidar unit 7 is reduced, the control device 6 can promote a smooth switchover to manual driving and appropriately suppress a decrease in safety.

As described above, the control device 6 according to the first embodiment functionally includes the detection unit 61 and the control unit 62. The detection unit 61 detects a change in the positioning angle of the scanner L that emits electromagnetic waves to the outside of the vehicle, based on the alignment information IA generated at the time of alignment and the measurement information on the lidar unit 7 received from the attitude sensor 8. The control unit 62 then controls the direction of emission by the scanner L based on the detection result given by the detection unit 61. Consequently, even when the lidar unit 7 is misaligned due to an accident or the like, the control device 6 can appropriately maintain a state in which autonomous driving can be continued by performing the calibration of the lidar unit 7.

Second Embodiment

The second embodiment differs from the first embodiment in that the control device 6 performs calibration based on the result of detection of the deviation of the actual scan area FOV with respect to the tilt of the detected feature, instead of, or in addition to calibration based on the deviation between the reference angle indicated by the alignment information IA and the latest measurement angle measured by the attitude sensor 8. Hereinafter, the same components as those in the first embodiment are appropriately denoted by the same reference numerals, and their description will be omitted.

Figure 10:
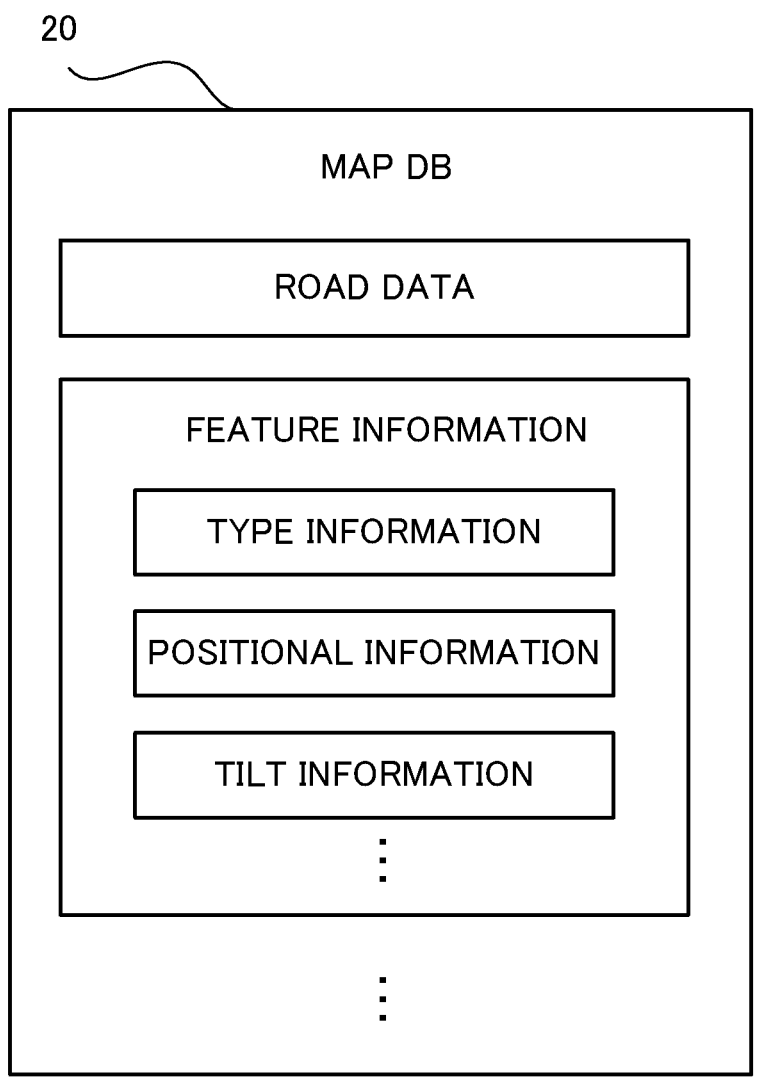
FIG. 10 shows an example of a data structure of a map DB according to a second embodiment.

FIG. 10 shows an example of a data structure of a map DB 20 according to the second embodiment. As shown in FIG. 10, the map DB 20 includes feature information on features around the road, in addition to, for example, road data. The feature information is information registered for each feature, and includes type information, positional information, and tilt information. It is noted that the use of a map DB including such feature information enables navigation of the vehicle in manual driving and advanced vehicle drive control in autonomous driving.

Here, type information is information indicating the type of a feature and is referred to, for example, in a process for determining whether or not the feature around the vehicle is suitable as a feature to be used as a reference in calibration (also referred to as a "reference feature"). The positional information is information indicating the absolute position of the feature, and is referred to in a process of specifying a position of a feature relative to the vehicle. The tilt information is information indicating a tilt angle of a feature with respect to a road surface.

Here, the tilt information may indicate an angle formed by a contour of a side surface (including a front, surface and a back surface) of a feature with respect to a road surface, or an angle formed by a line indicating a symmetry axis of the contour of the feature (a line passing through the center of gravity of the feature) with respect to a road surface. This will be described with reference to FIG. 11.

Figure 11A:
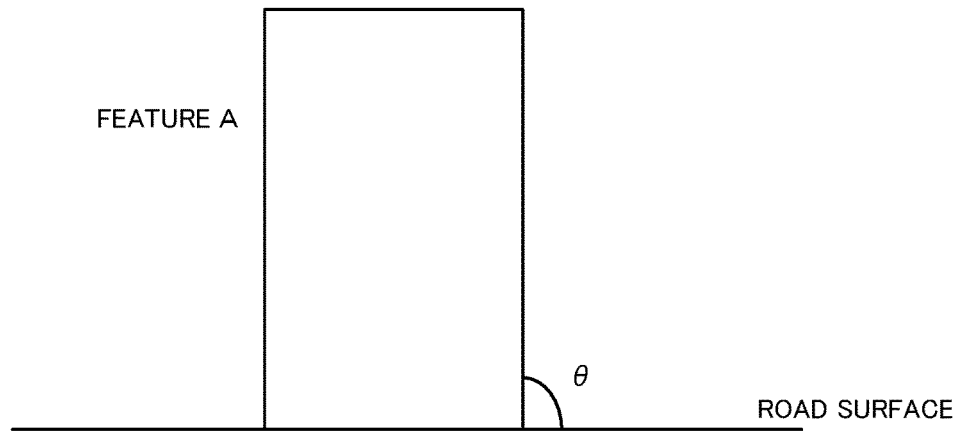
FIGS. 11A-11C each show a diagram showing a relationship between a feature and a tilt angle indicated by tilt information in feature information.

FIG. 11A is a diagram showing relationship between a feature A having a rectangular contour when observed from above a road and a tilt angle θ indicated by the tilt information in the feature information on the feature A. In FIG. 11A, the feature A has a prismatic or cylindrical shape, and the tilt angle θ indicated by the tilt information in the feature information corresponding to the feature A is the angle formed by a side surface of the feature A (including the front and back surfaces) with respect to the road surface (here, about 90 degrees).

Figure 11B:
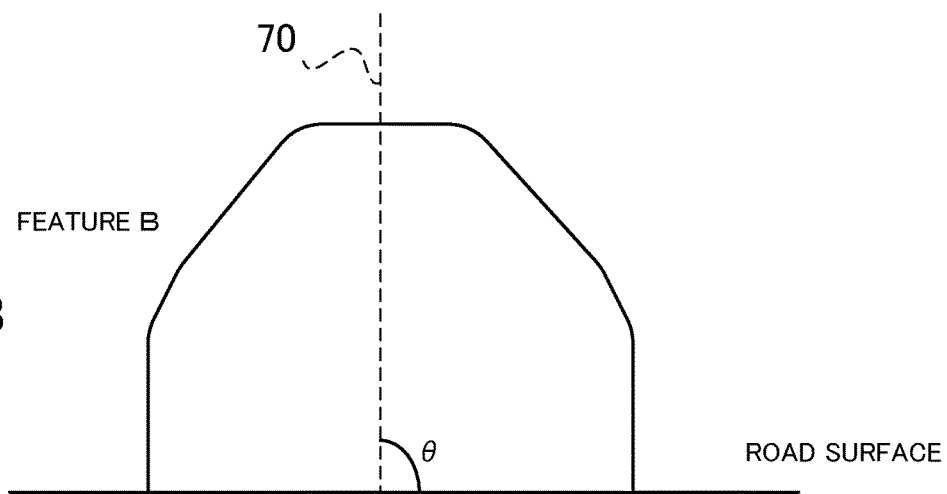

FIG. 11B is a diagram showing relationship between a feature B having a contour tapered toward the top when observed from above a road and a tilt angle θ indicated by the tilt information in the feature information on the feature B. In FIG. 11B, the contour of the feature 3 has a shape with a dashed line as the axis of symmetry. The dashed line 70 is a line passing through the center of gravity of the contour of the feature B, and is a line substantially parallel to the contour representing the side surface of the feature B. The tilt angle θ indicated by the tilt information on the feature information corresponding to the feature B indicates an angle formed by the dashed line 70 with respect to the road surface (here, about 90 degrees). As described above, in an example shown in FIG. 11B, information on the tilt of the whole feature B is recorded in the feature information as the tilt information. In this case, a predetermined flag indicating the fact that the tilt information indicates the tilt angle of a line passing through the center of gravity of the feature may be added to the feature information.

Figure 11C:
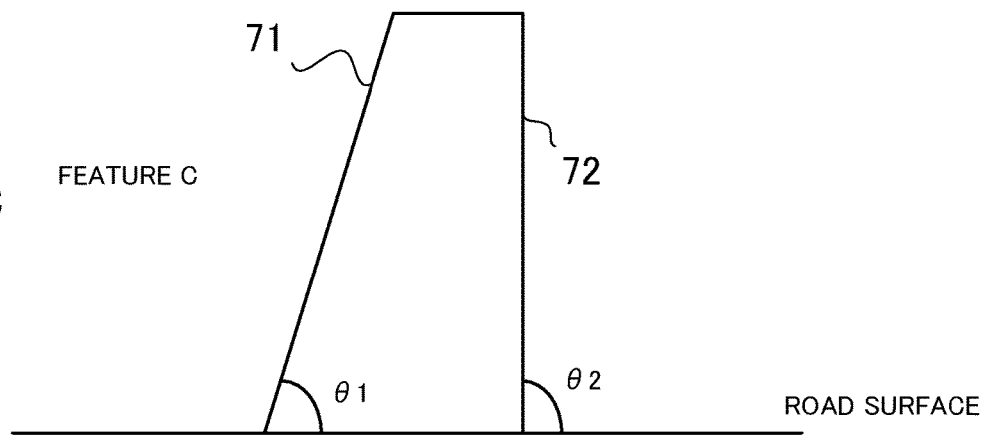

FIG. 11C is a diagram showing relationship between a feature C observed from above a road and tilt angles θ1 and θ2 indicated by the tilt information in the feature information on the feature C. In FIG. 11C, the feature C has contour lines 71 and 72 forming side surfaces and forming different angles θ1 and θ2 with respect to the road surface. In this case, the feature information corresponding to the feature C includes the tilt information indicating the tilt angles θ1 and θ2 related to the contour lines 71 and 72. In this case, the feature information preferably has a data structure that can identify a correspondence between the contour line detected by the lidar unit 7 and the tilt angle recorded in the feature information. For example, in the feature information, the tilt angles may be recorded in order from the tilt angle of the contour line closest to the road.

The control device 6 refers to the feature information including the tilt information based on any of the formats described in FIGS. 11A to 11C and specifies a line (also referred to as a "feature reference line Lo") that approximately connects points forming the tilt angle indicated by the tilt information in the feature information, from the point cloud forming the contour of the reference feature detected by the lidar unit 7. The control device 6 then calculates the angle formed between the specified feature reference line Lo and a line forming an arbitrary side of a boundary of the rectangular actual scan area FOV (also referred to as an "actual scan boundary line Lf"). The control device 6 detects a misalignment of the lidar unit 7 based on the angle between the feature reference line Lo and the actual scan boundary line Lf (also referred to as a "reference angle θtag") and the tilt angle indicated by the corresponding tilt information. Thus, the information on the reference angle θtag serves as the first information, and the tilt information serves as the second information.

A specific example of misalignment detection method based on the reference angle θtag and the tilt angle indicated by the tilt information will now be described with reference to FIG. 12.

Figure 12A:
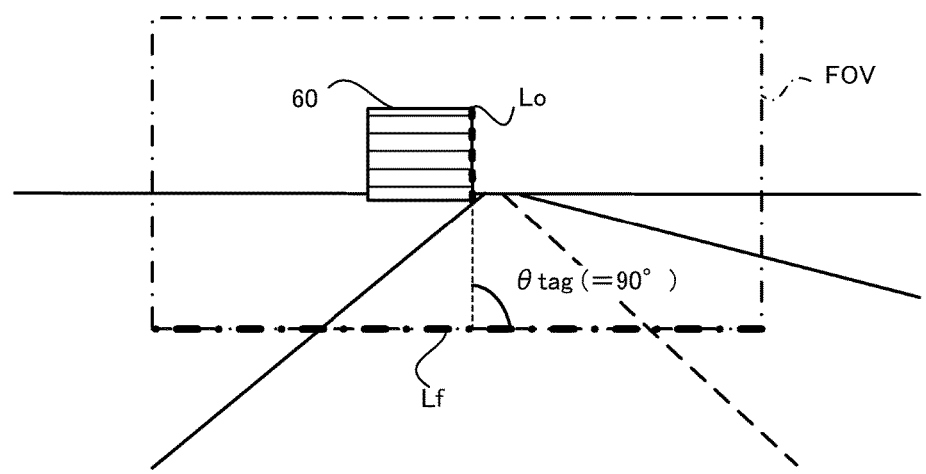
FIGS. 12A-12C each show a diagram showing a correspondence between an actual scan area of a scanner and a scenery overlapping the actual scan area.

FIG. 12A is a diagram showing a correspondence between an actual scan area FOV of a scanner L before the occurrence of a misalignment, and a scenery overlapping the actual scan area FOV. In an example shown in FIG. 12A, when no misalignment occurs, a lateral direction of the actual scan area FOV of the target scanner L is parallel to a road surface (that is, a horizontal line).

In this case, the control device 6 first extracts a point cloud forming the contour of a feature 60 from the point cloud information generated by the lidar unit 7. The control device 6 projects the point cloud forming the contour of the feature 60 on the same plane as the actual scan area FOV, and specifies the point cloud forming the contour of a side surface of the feature 60 from the point cloud on that plane, thereby recognizing the feature reference line Lo. In this case, for example, the control device 6 may assume that the actual scan area FOV is in an area of a virtual face separated from the vehicle by a predetermined distance and is an area irradiated with a transmission light pulse. Further, the control device 6 determines the actual scan boundary line Lf (here, a bottom side of the actual scan area FOV) from the boundary line of the actual scan area FOV, and calculates the reference angle θtag from the determined actual scan boundary line Lf and the feature reference line Lo.

The control device 6 then calculates the calculated an angular difference between the reference angle θtag (here, 90 degrees) and the tilt angle (here, 90 degrees) indicated by the tilt information in the feature information corresponding to the feature 60. In this case, the aforementioned angular difference is 0 degree, so that the control device 6 judges that the scanner L corresponding to the target actual scan area FOV has no angular deviation in the example shown in FIG. 12A. Therefore, in this case, the control device 6 judges that calibration is not necessary for the target scanner L.

Figure 12B:
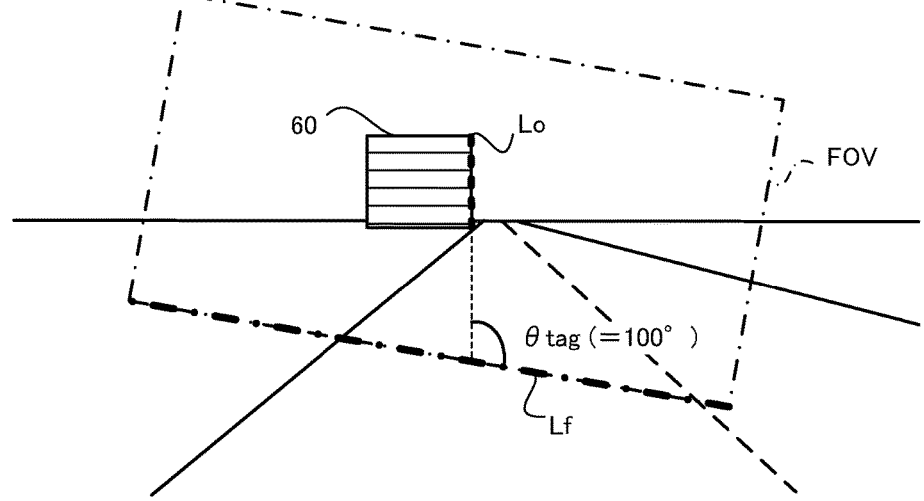

FIG. 12B is a diagram showing a correspondence between the actual scan area FOV of a scanner L having a misalignment, and a scenery overlapping the actual scan area FOV.

In this case, the control device 6 specifies the actual scan boundary line Lf and the feature reference line Lo by executing the sane process as that shown in FIG. 12A and calculates the reference angle θtag between the actual scan boundary line Lf and the feature reference line Lo. The control device 6 then calculates the angular difference (here, 10 degrees) between the calculated reference angle θtag (here, 100 degrees) and the tilt angle (here, 90 degrees) of the feature 60 indicated by the referred tilt information. In this case, the above-described angular difference is greater than or equal to a predetermined difference, so that the control device 6 judges that the target scanner L is misaligned. Accordingly, in this case, the control device 6 judges that it is necessary to execute calibration for the target scanner L.

Figure 12C:
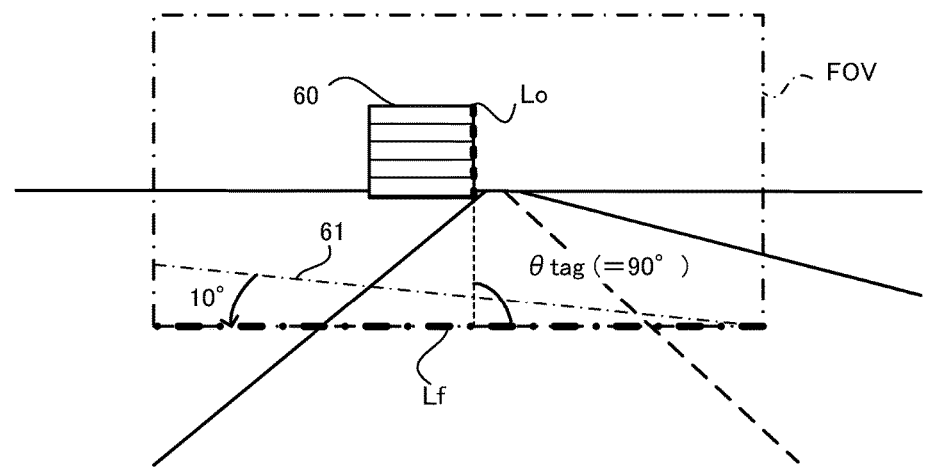

FIG. 12C is a diagram showing a correspondence between the actual scan area FOV after the calibration, and a scenery overlapping the actual scan area FOV. In FIG. 12O, a dot-dash line 61 indicates a position of the actual scan boundary Line Lf before the execution of the calibration.

The control device 6 judges, based on the above-described angular difference, that the scanner L corresponding to the target actual scan area FOV is deviated by 10 degrees in the roll direction (clockwise). Therefore, in this case, the control device 6 rotates the actual scan area FOV by 10 degrees in the roll direction (counterclockwise) using the calibration method described in [Calibration Process] of the first, embodiment. As a result, as shown in FIG. 12C, the longitudinal direction of the actual scan area FOV and the road surface are substantially parallel, and these are in the same correspondence as before the target scanner L is misaligned (that is, before the impact on the vehicle occurs).

As described above, the control device 6 calculates the reference angle θtag formed by the actual scan boundary line Lf and the feature reference line Lo, thereby appropriately determining whether or not calibration is necessary and performing the calibration. In a state where there is no misalignment, the longitudinal direction of the actual scan area FOV is not necessarily parallel to the road surface, and may have a predetermined tilt angle with respect to the road surface. In this case, for example, the control device 6 previously stores information of the tilt angle, and also considers the above-described tilt angle for the angular difference between the reference angle θtag and the tilt angle indicated by the tilt information, thereby determining whether or not calibration is necessary and performing the calibration.

When the tilt information on the reference feature represents the tilt angle of a line passing through the center of gravity of a feature as in the example shown in FIG. 11B, the control device 6 determines the center of gravity of the point cloud obtained by projecting the point cloud of the reference feature on the same plane as the actual scan area FOV, and calculates a feature reference line Lo (for example, a symmetric line) passing through the determined center of gravity, using a predetermined calculation method. In a case where a tilt angle for each contour is recorded in the tilt information on the reference feature (see FIG. 11C), the control device 6 calculates the feature reference line Lo based on at least one tilt angle indicated by the tilt information and the point cloud information representing the contour portion corresponding to the tilt angle. In this case, for example, the control device 6 may calculate the feature reference line Lo based on the point cloud information on the contour corresponding to the tilt angle close to 90 degrees, and may calculate the feature reference line Lo based on the point cloud information on the contour that was detected as the point cloud information.

Figure 13:
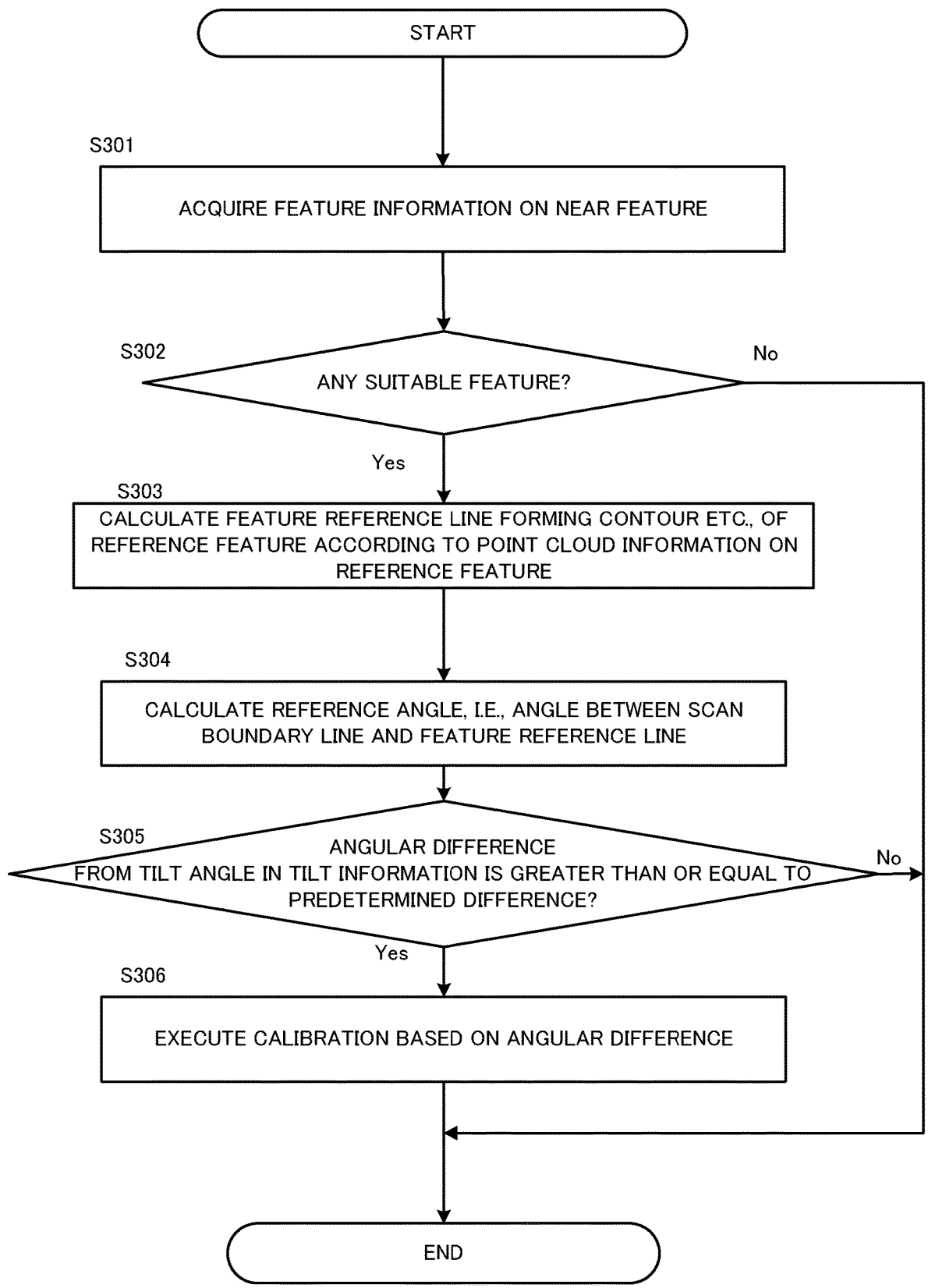
FIG. 13 is a flowchart illustrating a calibration process procedure with respect to a feature according to a second embodiment.

FIG. 13 is a flowchart illustrating a calibration process procedure with respect to a feature according to a second embodiment. The control device 6 repeatedly executes the process of the flowchart in FIG. 13, for example, in a predetermined cycle. It is noted that the control device 6 may execute the process of the flowchart shown in FIG. 13 in parallel with the process of the flowchart shown in FIG. 9 described in the first embodiment, or instead of the process of the flowchart shown in FIG. 9.

First, the control device 6 acquires the feature information on a feature existing around the vehicle (Step S301). In this case, for example, the control device 6 refers to the own vehicle positional information generated based on, for example, the positional information in the feature information and the output of the sensor unit 3, and extracts, from the map DB 20, the feature information on a feature existing in an area within the maximum measurement distance of the lidar unit 7 from the own vehicle position and in the actual scan area FOV of any of the scanners L.

Next, the control device 6 determines whether or not there is a feature suitable as a reference feature (Step S302). In this case, for example, the control device 6 refers to the type information included in the feature information acquired in Step S301, and determines whether there is a fixed object such as a building whose contour does not change due to weather conditions such as wind and other external environments. In another example, the control device 6 determines a feature (for example, a building, a signal pole, or a power pole) estimated to be perpendicular to the road surface, as a feature suitable as the reference feature. In this example, the control device 6 may estimate whether or not the feature is perpendicular to the road surface based on the type information in the feature information, and may perform the aforementioned determination depending on whether or not the tilt angle of the contour of the feature indicated by the tilt information included in the feature information is about 90 degrees.

When there are features suitable as a reference feature (Step S302; Yes), the control device 6 regards each feature as the reference feature, and performs processes of the following Steps S303 to S306. In contrast, when there is no feature suitable as the reference feature (Step S302; No), the control device 6 ends the process of the flowchart.

Next, for each reference feature, the control device 6 calculates a feature reference line Lo that forms a line passing through the contour or the center of gravity of the feature, based on the point cloud information on each feature (Step S303). In this case, based on, for example, the positional information on the features, the control device 6 extracts a point cloud for each reference feature from the point cloud information obtained from the lidar unit 7, and calculates, for each reference feature, the feature reference line Lo forming the contour and the like of the reference feature.

The control device 6 then specifies, for the feature reference line Lo of each calculated reference feature, the actual scan boundary line Lf based on the actual scan area FOV of the scanner L including each reference feature in the detection area, and calculates the reference angle θtag (Step S304). The control device 6 then determines whether or not there is a reference feature whose angular difference between the tilt angle indicated by the tilt information and the reference angle θtag is greater than or equal to a predetermined angular difference (Step S305). The above-described predetermined angle is predetermined in consideration of, for example, the necessity of calibration based on the angular difference and errors in calculation of the reference angle θtag.

When there is a reference feature whose angular difference between the tilt angle indicated by the tilt information and the reference angle θtag is greater than or equal to a predetermined angular difference (Step S305; Yes), the control device 6 judges that the actual scan area FOV used for calculation of the reference angle θtag is misaligned, and performs calibration based on the above-described angular difference, for the scanner L corresponding to the actual scan area FOV (Step S306). In this case, the control device 6 rotates the target actual scan area FOV by the electronic adjustment or the physical adjustment under the control by the adjustment mechanism 10 so that the above-described angular difference is eliminated. It is noted that, similarly to the process of the flowchart shown in FIG. 9 described in the first embodiment, the control device 6 may issue a notification about the execution of the calibration before executing the calibration and, upon detection of an input indicating that the calibration should be executed, execute the calibration.

In contrast, when there is no reference feature whose angular difference between the tilt angle indicated by the tilt information and the reference angle θtag is greater than or equal to the predetermined angle (Step S305; No), the misalignment of the scanner L is not detected and the control device 6 judges that, there is no need to execute calibration. Consequently, in this case, the control device 6 ends the process of the flowchart without executing calibration.

As described above, the control device 6 according to the second embodiment acquires an output signal from the lidar unit 7 that can detect a feature existing around the vehicle, and calculates the reference angle θtag, indicating the tilt angle of the feature to be recognized based on the output signal from the lidar unit 7, with respect to the detection area of the lidar unit 7. The control device 6 then controls the detection area of the lidar unit 7 based on the reference angle θtag and the tilt information stored in the storage unit 2 and indicating the angle of the feature with respect to the road surface. Consequently, similarly to the first embodiment, when the lidar unit 7 is misaligned, the control device 6 can appropriately maintain a state in which autonomous driving can be continued by performing the calibration of the lidar unit 7.

Third Embodiment

The third embodiment differs from the second embodiment in that the feature information included in the map DB 20 includes information indicating whether or not calibration can be executed using the target feature as the reference feature (also referred to as "calibration availability information Ic"). In the third embodiment, the control device 6 determines the suitability of each feature as the reference feature by referring to the calibration availability information Ic.

Figure 14:
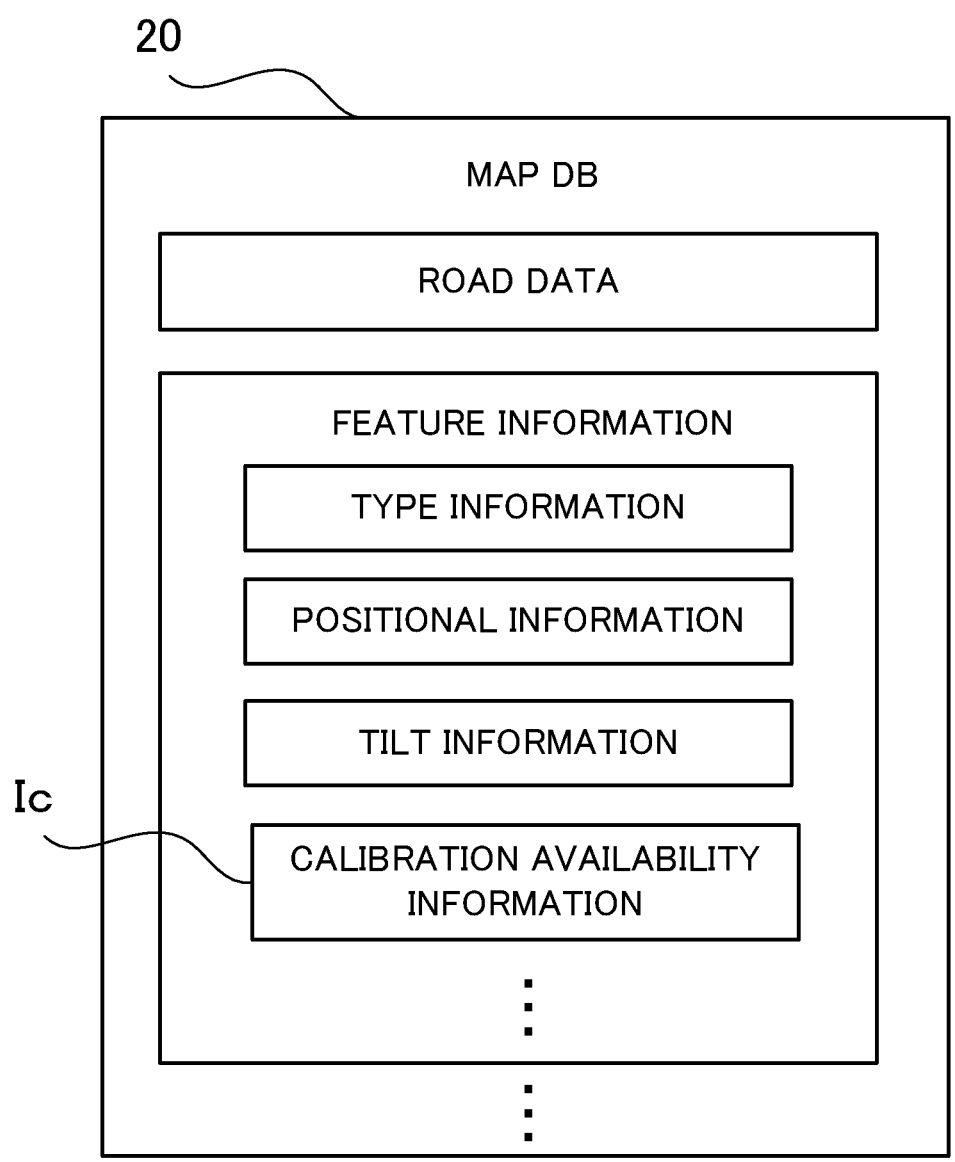
FIG. 14 shows a data structure of a map DB according to a third embodiment.

FIG. 14 shows a data structure of the map DB 20 stored in the storage unit 2 in the third embodiment. As shown in FIG. 14, the map DB 20 has the feature information, and the feature information includes the calibration availability information Ic in addition to the type information, the positional information, and the tilt information described above. Here, the calibration availability information Ic is flag information (adjustment availability information) indicating permission information for permitting execution of calibration using the corresponding feature as the reference feature, or non-permission information for not permitting execution of calibration.

Examples of the features for which the calibration availability information Ic indicating that calibration is permitted is added to the feature information include fixed objects whose contour does not fluctuate due to external environments, such as buildings, features substantially perpendicular to the road surface, and features that fluctuate less in contour inclination (that is, features having a contour close to a straight line). As described above, the calibration availability information Ic indicating that calibration is permitted is added to the feature information on a feature suitable for calculating the feature reference line Lo (that is, such that errors of calculation of the feature reference line Lo are reduced). Examples of features for which the calibration availability information Ic indicating that calibration is not permitted is added to the feature information include features whose contour is likely to fluctuate due to external environments, features inclined with respect to the road surface, and features that fluctuate much in contour inclination (that is, features having a contour in a curved line or other complex shapes). It is noted that the calibration availability information Ic is not necessarily included in the feature information on all features, and may be added to only the feature information on features to be reference features for which calibration is permitted, or may be added to only the feature information on features to be reference features for which calibration is not permitted.

The storage unit 2 stores the feature information having the data structure shown in FIG. 14 and supplies it to the control device 6. The control device 6 then executes the flowchart shown in FIG. 13 based on the feature information supplied from the storage unit 2. In this case, in Step S302, the control device 6 determines whether or not each feature is suitable as the reference feature by referring to the calibration availability information Ic included in the feature information on each feature. The control device 6 then regards the feature, which has been determined as suitable as the reference feature based on the calibration availability information Ic, as a reference feature, and executes the processes of Steps S303 to S306. Hence, the control device 6 can accurately select the reference feature, and can more accurately determine whether or not the calibration can be executed and execute the calibration.

As described above, the storage unit 2 of the measurement system 100 according to the third embodiment stores the feature information that has the data structure including the calibration availability information Ic indicating, for the lidar unit 7 disposed in the vehicle, whether or not to permit calibration of the detection area of the lidar unit 7 based on the feature information. Thus, the control device 6 can accurately select a feature to be a reference for the calibration of the detection area of the lidar unit 7.

<Modifications>

Modifications suitable for the first to third embodiments will now be described. The following modifications may be arbitrarily combined and applied to the aforementioned embodiments.

(Modification 1)

In the first to third embodiments, a part or all of the process in the control device 6 may be executed by the signal processing unit SP of the lidar unit 7. For example, the signal processing unit SP may execute the process of the flowchart in FIG. 9 instead of the control device 6. In this case, the signal processing unit SP refers to the alignment information IA or the like in the storage unit 2 or the memory built in the lidar unit 7 and acquires an output value from the attitude sensor 8 provided in each scanner container 50 or the like, thereby executing the processes of Steps S201 to S204 shown in FIG. 9. In addition, in the calibration process in Step S208, the signal processing unit SP transmits a control signal, which is used to adjust the scan area according to the detected angular deviation, to the adjustment mechanism 10 and/or the optical transceiver TR. Similarly, the signal processing unit SP may execute the process of the flowchart shown in FIG. 13 instead of the control device 6. In this modification, the signal processing unit SP may transmit and receive signals to and from components of the measurement system 100, such as the input unit 1, the storage unit 2, and the attitude sensor 3, not via the control device 6. When the signal processing unit SP executes all the processes in the control device 6, the measurement system 100 is not necessarily provided with the control device 6.

(Modification 2)

In the first to third embodiments, in the examples shown in FIG. 4 and other drawings, a plurality of scanners L are provided to the vehicle but this is not necessarily the case and only one scanner L may be provided to the vehicle. In this case, the scanner L scans a transmission light pulse in the range of, for example, 360 degrees to emit a transmission light pulse to an object existing in an arbitrary direction of the vehicle. Even in this case, the control device 6 detects the misalignment of the scanner L installed in the vehicle based on any one of the first to third embodiments, and performs the calibration process as necessary, so that autonomous driving can be appropriately continued. Thus, at least one scanner L should be provided to the vehicle.

(Modification 3)

In the first embodiment, in the description of FIG. 6, the control device 6 detects changes in the angle of each scanner L of the lidar unit 7 around the XYZ axes with respect to the vehicle based on the output of the attitude sensor 6. In addition, the control device 6 may detect positional changes of the scanner L around the XYZ axes with respect to the vehicle.

In this case, for example, a sensor (position detection sensor) that detects positional changes is provided in each scanner container 50 or the scanner L, and the adjustment mechanism 10 has a function of moving the scanner container 50 or the scanner L in parallel. In the alignment process shown in FIG. 8, the control device 6 stores information on the position and the positioning angle of each scanner L after alignment adjustment in the storage unit 2, as the alignment information IA. The control device 6 then executes the process of the flowchart shown in FIG. 9, based on the alignment information IA stored in the storage unit 2. In this case, in Step S203, the control device 6 detects whether or not there is a misalignment related to the position and positioning angle of the scanner container 50 or the scanner L, based on the output of the attitude sensor 3 and the output of the above-described position detection sensor. Subsequently, as in the embodiments, the control device 6 executes the processes of Steps S204 to S210 to execute calibration related to the misalignment of the scanner L and display a predetermined warning or perform a switchover to manual driving. As described above, even when the position of the scanner L is changed, the measurement of the surrounding environment can be appropriately continued by the calibration, or a switchover to manual driving can be made for safety.

(Modification 4)

In the first to third embodiments, the measurement system 100 may detect misalignments and perform a calibration process for an external sensor, other than the lidar unit 7, that emits electromagnetic waves instead of detecting the misalignment of the lidar unit 7. With this also, when a deviation of the position of an external sensor needed for autonomous driving is estimated, the measurement system 100 performs a calibration process and the like for the external sensor to compensate for the deviation, with the same procedure as the flowchart shown in FIG. 9 or FIG. 13. This appropriately suppresses changes of the detection area of the external sensor between before and after the occurrence of an accident and when the calibration process cannot be executed, promotes a switchover to manual driving, thereby ensuring safety.

(Modification 5)

In the first embodiment, the control device 6 may generate or update the alignment information IA at a predetermined time other than immediately after alignment adjustment. For example, when determining that travel road of the vehicle is a flat road, the control device 6 generates the alignment information IA based on the output signal from the attitude sensor 8 provided in each scanner container 50, and stores it in the storage unit 2. In this case, the control device 6 may determine whether or not the travel road of the vehicle is a flat road based on the output of an acceleration sensor that detects the tilt of the vehicle, and may determine whether or not the travel road of the vehicle is a flat road based on the current positional information and the road tilt information in road data included in the map DB 20.

(Modification 6)

In the first to third embodiments, instead of including the map DB 20, the measurement system 100 may receive information necessary for the process from a server device that stores information equivalent to the map DB 20.

Figure 15:
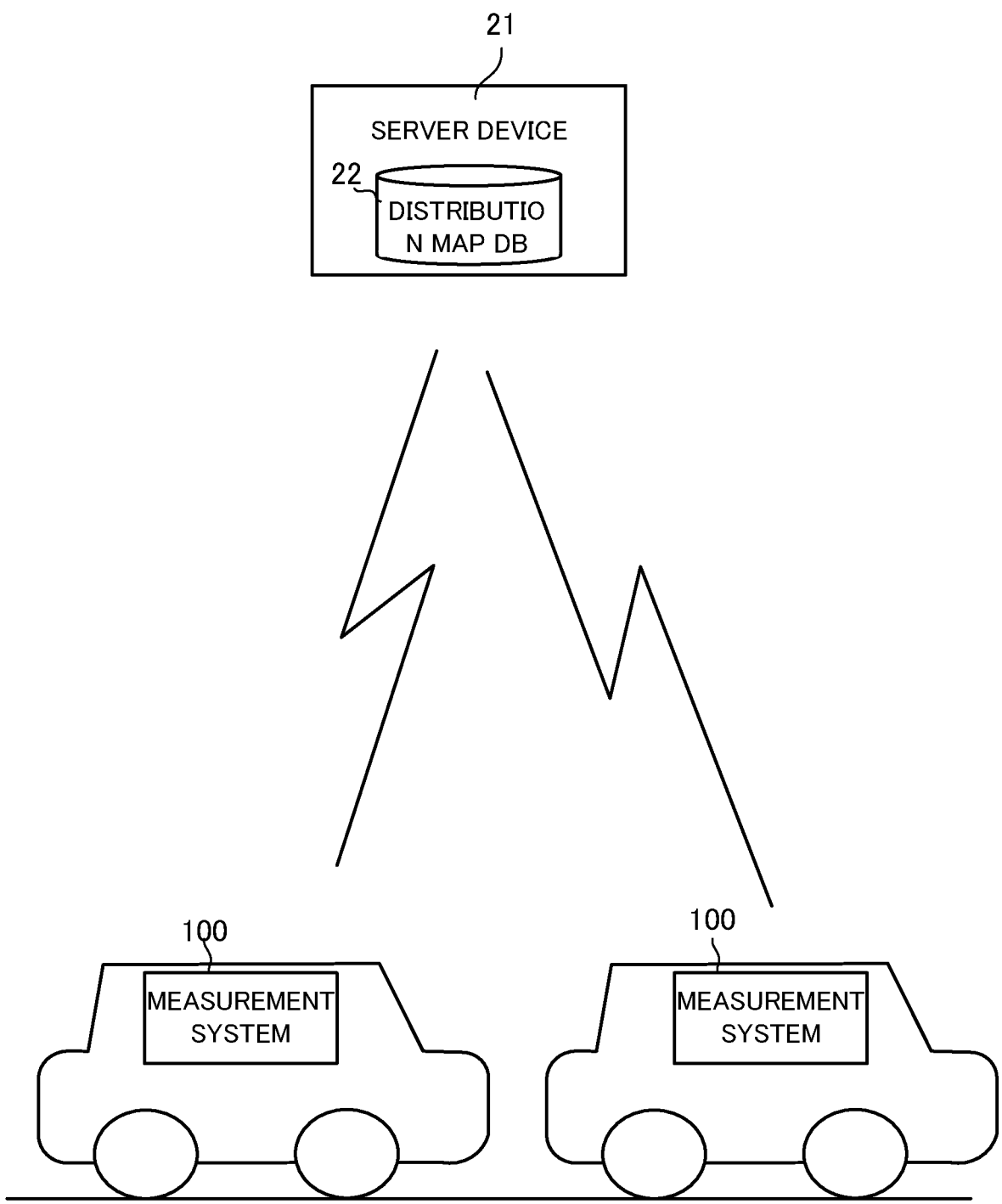
FIG. 15 is an example system configuration of a modification.

FIG. 15 shows an example configuration according to this modification. In an example shown in FIG. 15, the server device 21 includes a distribution map DB 22 having the same data structure as the map DB 20 shown in FIG. 14, and transmits data such as the feature information including the calibration availability information Ic to the measurement system 100 mounted on each vehicle. In this case, the measurement, system 100 may be a communication device such as vehicle-borne equipment or a system built in a vehicle. In the case of the third embodiment, for example, the measurement system 100 executes calibration based on the flowchart shown in FIG. 13, based on the feature information and the like received from the server device 21. In this case, the measurement system 100 can accurately determine whether or not a feature around the vehicle is suitable as the reference feature, based on the calibration availability information Ic, and can determine whether or not calibration is necessary and can execute the calibration.

BRIEF DESCRIPTION OF REFERENCE NUMBERS

1 Input unit
2 Storage unit
3 Sensor unit
4 Notification unit
5 Communication unit
6 Control device
100 Measurement system

The invention claimed is:

1. A control device comprising:
 a processor coupled to a memory storing instructions to permit the processor to function as:
  a first acquisition unit configured to acquire an output signal from a detection device which is mounted on a moving object and which is capable of detecting a feature existing around the moving object based on reflected light of transmission light from the detection device;
  a second acquisition unit configured to acquire first information on a tilt of a line based on a contour of the feature with respect to a detection area within an irradiation range of the transmission light by the detection device, the feature being recognized based on the output signal from the detection device on a plane perpendicular to a direction of light emission by the detection device; and a controller configured to control the detection area based on the first information and second information on an angle of the line based on the contour of the feature with respect to a road surface, the second information being stored in a storage unit.

2. The control device according to claim 1, wherein the first information is information on an angle between a line forming a side of a boundary of the detection area and the line based on the contour of the feature recognized based on the output signal, and wherein the second information is information on a tilt angle of the line based on the contour of the feature with respect to the road surface.

3. The control device according to claim 1, wherein the first information is information on an angle between a line forming a side of a boundary of the detection area by and a line indicating a symmetry axis of a contour of the feature recognized based on the output signal, and wherein the second information is information on a tilt angle of the line indicating the symmetry axis with respect to the road surface.

4. The control device according to any claim 1, wherein the controller controls the detection area by the detection device based on first information on a tilt of, among features recognized based on the output signal from the detection device, the line based on the contour of the feature perpendicular to the road surface with respect to the detection area, and second information on an angle of the line based on the contour of the feature with respect to the road surface.

5. The control device according to claim 1, wherein the controller controls the detection area by the detection device based on first information on a tilt of, among features recognized based on the output signal from the detection device, the line based on the contour of the feature that does not change with environment with respect to the detection area, and second information on an angle of the line based on the contour of the feature with respect to the road surface.

6. A control method comprising:

acquiring an output signal from a processor that functions as a detection device which is mounted on a moving object and which is capable of detecting a feature existing around the moving object based on reflected light of transmission light from the detection device;

acquiring first information on a tilt of a line based on a contour of the feature with respect to a detection area within an irradiation range of the transmission light by the detection device on a plane perpendicular to a direction of light emission by the detection device, the feature being recognized based on the output signal from the detection device; and controlling the detection area based on the first information and second information on an angle of the line based on the contour of the feature with respect to a road surface, the second information being stored in a storage unit.

7. A non-transitory computer readable medium including instructions to be executed by a computer, the instructions comprising:

acquiring an output signal from a processor that functions as a detection device which is mounted on a moving object and which is capable of detecting a feature existing around the moving object based on reflected light of transmission light from the detection device;

acquiring first information on a tilt of a line based on a contour of the feature with respect to a detection area within an irradiation range of the transmission light by the detection device on a plane perpendicular to a direction of light emission by the detection device, the feature being recognized based on the output signal from the detection device; and controlling the detection area based on the first information and second information on an angle of the line based on the contour of the feature with respect to a road surface, the second information being stored in a storage unit.

* * * * *